(12) United States Patent
Williams et al.

(10) Patent No.: US 10,993,867 B2
(45) Date of Patent: May 4, 2021

(54) ACTUATION ASSEMBLY FOR AN ORAL IRRIGATOR

(71) Applicant: WATER PIK, INC., Fort Collins, CO (US)

(72) Inventors: Brian R. Williams, Fort Collins, CO (US); Robert D. Wagner, Firestone, CO (US)

(73) Assignee: WATER PIK, INC., Fort Collins, CO (US)

( * ) Notice: Subject to any disclaimer, the term of this patent is extended or adjusted under 35 U.S.C. 154(b) by 666 days.

(21) Appl. No.: 15/448,333

(22) Filed: Mar. 2, 2017

(65) Prior Publication Data

US 2017/0252251 A1     Sep. 7, 2017

Related U.S. Application Data

(60) Provisional application No. 62/302,565, filed on Mar. 2, 2016.

(51) Int. Cl.
| | | |
|---|---|---|
| *A61G 15/16* | (2006.01) | |
| *H01H 3/08* | (2006.01) | |
| *H01H 3/62* | (2006.01) | |
| *A61C 17/02* | (2006.01) | |
| *A61H 13/00* | (2006.01) | |

(52) U.S. Cl.
CPC .......... *A61G 15/16* (2013.01); *A61C 17/0202* (2013.01); *A61H 13/005* (2013.01); *H01H 3/08* (2013.01); *H01H 3/62* (2013.01)

(58) Field of Classification Search
CPC .. A61C 17/0202; A61G 15/16; A61H 13/005; H01H 3/08; H01H 3/62; H01H 1/5805; H01H 9/0271; H01H 9/16; H01H 9/06; H01H 19/14; H01H 2009/0285; F16F 15/0235; F16F 15/16; F16F 9/12; F16F 2224/04; F16F 2228/008; G05G 1/10
See application file for complete search history.

(56) References Cited

U.S. PATENT DOCUMENTS

| | | |
|---|---|---|
| 555,588 A | 3/1896 | Spencer |
| 1,278,225 A | 9/1918 | Schamberg |

(Continued)

FOREIGN PATENT DOCUMENTS

| | | |
|---|---|---|
| CA | 851479 | 9/1970 |
| CH | 655237 | 4/1986 |

(Continued)

OTHER PUBLICATIONS

US RE27,274 E, 01/1972, Mattingly (withdrawn)

(Continued)

*Primary Examiner* — Tu A Vo
*Assistant Examiner* — Alexander Morales
(74) *Attorney, Agent, or Firm* — Dorsey & Whitney LLP

(57) ABSTRACT

An actuation assembly for an oral irrigator includes a bezel secured to or formed as part of a housing of the oral irrigator, an actuator operably connected to the bezel and moveable relative thereto, and an augmentation fluid positioned between the bezel and the actuator. The augmentation fluid modifies a frictional relationship between the bezel and the actuator to provide a predefined resistance force between the actuator and the bezel as the actuator is rotated relative to the bezel.

21 Claims, 20 Drawing Sheets

(56) References Cited

U.S. PATENT DOCUMENTS

| | | |
|---|---|---|
| 1,452,258 A | 4/1923 | Smith |
| 1,464,419 A | 8/1923 | Gill |
| 1,480,310 A | 1/1924 | Smith |
| 1,498,267 A | 6/1924 | Hachman |
| 1,650,686 A | 11/1927 | Binks |
| 1,669,889 A | 5/1928 | Andrews et al. |
| 1,681,320 A | 8/1928 | Bergl et al. |
| 1,933,454 A | 10/1933 | Sidney |
| 1,940,111 A | 12/1933 | Austin |
| D93,019 S | 8/1934 | Hose |
| 1,977,782 A | 10/1934 | Roy |
| 2,107,686 A | 2/1938 | Bramsen et al. |
| D159,872 S | 8/1950 | Skold |
| 2,531,730 A | 11/1950 | Henderson |
| 2,595,666 A | 5/1952 | Hutson |
| 2,669,233 A | 2/1954 | Friend |
| 2,709,227 A | 5/1955 | Foley et al. |
| 2,783,919 A | 3/1957 | Ansell |
| 2,794,437 A | 6/1957 | Tash |
| 2,870,932 A | 1/1959 | Davis |
| 2,984,452 A | 5/1961 | Hooper |
| 3,089,490 A | 5/1963 | Goldberg |
| 3,096,913 A | 7/1963 | Jousson |
| 3,144,867 A | 8/1964 | Trupp et al. |
| D202,041 S | 8/1965 | Burzlaff |
| 3,209,956 A | 10/1965 | McKenzie |
| 3,216,619 A | 11/1965 | Richards et al. |
| 3,225,759 A | 12/1965 | Drapen et al. |
| 3,227,158 A | 1/1966 | Mattingly |
| 3,266,623 A | 8/1966 | Poferl |
| 3,297,558 A | 1/1967 | Hillquist |
| D208,778 S | 10/1967 | Koch |
| D209,204 S | 11/1967 | St. Clair et al. |
| D209,395 S | 11/1967 | Gilbert |
| D210,018 S | 1/1968 | Mattingly et al. |
| D210,019 S | 1/1968 | Johnson et al. |
| 3,370,214 A | 2/1968 | Aymar |
| 3,391,696 A | 7/1968 | Woodward |
| 3,393,673 A | 7/1968 | Mattingly et al. |
| 3,400,999 A | 9/1968 | Goldstein |
| 3,418,552 A | 12/1968 | Holmes |
| 3,420,228 A | 1/1969 | Kalbfeld |
| 3,425,410 A | 2/1969 | Cammack |
| 3,453,969 A | 7/1969 | Mattingly |
| 3,465,751 A | 9/1969 | Powers |
| 3,467,083 A | 9/1969 | Mattingly |
| D215,920 S | 11/1969 | McCarty et al. |
| 3,487,828 A | 1/1970 | Troy |
| 3,489,268 A | 1/1970 | Meierhoefer |
| 3,495,587 A | 2/1970 | Freedman |
| 3,496,933 A | 2/1970 | Lloyd |
| 3,499,440 A | 3/1970 | Gibbs |
| 3,500,824 A | 3/1970 | Gilbert |
| 3,501,203 A | 3/1970 | Falk |
| 3,502,072 A | 3/1970 | Stillman |
| 3,517,669 A | 6/1970 | Buono et al. |
| D218,270 S | 8/1970 | Soper |
| 3,522,801 A | 8/1970 | Robinson |
| 3,532,221 A | 10/1970 | Kaluhiokalani et al. |
| 3,536,065 A | 10/1970 | Moret |
| 3,537,444 A | 11/1970 | Garn |
| 3,538,950 A | 11/1970 | Porteners |
| 3,547,110 A | 12/1970 | Balamuth |
| 3,561,433 A | 2/1971 | Kovach |
| D220,334 S | 3/1971 | Mackay et al. |
| 3,570,525 A | 3/1971 | Borsum |
| 3,572,375 A | 3/1971 | Rosenberg |
| 3,578,884 A | 5/1971 | Jacobson |
| D220,996 S | 6/1971 | Irons |
| 3,583,609 A | 6/1971 | Oppenheimer |
| 3,590,813 A | 7/1971 | Roszyk |
| 3,608,548 A | 9/1971 | Lewis |
| D222,862 S | 1/1972 | Cook |
| 3,636,947 A | 1/1972 | Balamuth |
| 3,651,576 A | 3/1972 | Massa |
| 3,669,101 A | 6/1972 | Kleiner |
| 3,703,170 A | 11/1972 | Ryckman, Jr. |
| 3,747,595 A | 7/1973 | Grossan |
| 3,768,472 A | 10/1973 | Hodosh et al. |
| 3,783,364 A | 1/1974 | Gallanis et al. |
| 3,809,506 A | 5/1974 | Malcosky |
| 3,809,977 A | 5/1974 | Balamuth et al. |
| 3,811,432 A | 5/1974 | Moret |
| 3,820,532 A | 6/1974 | Eberhardt et al. |
| 3,827,147 A | 8/1974 | Condon |
| 3,837,166 A | 9/1974 | Hiraoka |
| 3,840,795 A | 10/1974 | Roszyk et al. |
| 3,847,145 A | 11/1974 | Grossan |
| 3,854,209 A | 12/1974 | Franklin et al. |
| 3,863,628 A | 2/1975 | Vit |
| 3,871,560 A | 3/1975 | Crippa |
| 3,874,506 A | 4/1975 | Hill et al. |
| 3,912,125 A | 10/1975 | Acklin |
| 3,943,628 A | 3/1976 | Kronman et al. |
| 3,959,883 A | 6/1976 | Walls et al. |
| 3,973,558 A | 8/1976 | Stouffer et al. |
| 3,977,084 A | 8/1976 | Sloan |
| 4,001,526 A | 1/1977 | Olson |
| 4,004,302 A | 1/1977 | Hori |
| 4,007,739 A | 2/1977 | Bron et al. |
| 4,013,227 A | 3/1977 | Herrera |
| 4,052,002 A | 10/1977 | Stouffer et al. |
| D246,667 S | 12/1977 | Mackay et al. |
| D246,668 S | 12/1977 | Mackay et al. |
| 4,060,870 A | 12/1977 | Cannarella |
| 4,075,761 A | 2/1978 | Behne et al. |
| 4,078,558 A | 3/1978 | Woog et al. |
| 4,094,311 A | 6/1978 | Hudson |
| 4,108,167 A | 8/1978 | Hickman et al. |
| 4,108,178 A | 8/1978 | Betush |
| 4,109,650 A | 8/1978 | Peclard |
| 4,122,845 A | 10/1978 | Stouffer et al. |
| 4,135,501 A | 1/1979 | Leunissan |
| 4,141,352 A | 2/1979 | Ebner et al. |
| 4,144,646 A | 3/1979 | Takemoto et al. |
| 4,149,315 A | 4/1979 | Page, Jr. et al. |
| 4,154,375 A | 5/1979 | Bippus |
| 4,160,383 A | 7/1979 | Rauschenberger |
| 4,171,572 A | 10/1979 | Nash |
| 4,182,038 A | 1/1980 | Fleer |
| 4,200,235 A | 4/1980 | Monschke |
| 4,201,200 A | 5/1980 | Hubner |
| 4,215,476 A | 8/1980 | Armstrong |
| 4,219,618 A | 8/1980 | Leonard |
| 4,227,878 A | 10/1980 | Lohn |
| 4,229,634 A | 10/1980 | Hickman et al. |
| 4,236,889 A | 12/1980 | Wright |
| D258,097 S | 2/1981 | Wistrand |
| 4,248,589 A | 2/1981 | Lewis |
| 4,249,899 A | 2/1981 | Davis |
| 4,257,458 A | 3/1981 | Kondo et al. |
| 4,262,799 A | 4/1981 | Perrett |
| 4,266,934 A | 5/1981 | Pernot |
| 4,276,023 A | 6/1981 | Phillips et al. |
| 4,276,880 A | 7/1981 | Malmin |
| 4,302,186 A | 11/1981 | Cammack et al. |
| 4,303,064 A | 12/1981 | Buffa |
| 4,303,070 A | 12/1981 | Ichikawa et al. |
| 4,306,862 A | 12/1981 | Knox |
| 4,315,741 A | 2/1982 | Reichl |
| 4,319,568 A | 3/1982 | Tregoning |
| 4,331,422 A | 5/1982 | Heyman |
| 4,337,040 A | 6/1982 | Cammack et al. |
| 4,340,365 A | 7/1982 | Pisanu |
| 4,340,368 A | 7/1982 | Lococo |
| D266,117 S | 9/1982 | Oberheim |
| 4,353,694 A | 10/1982 | Pelerin |
| 4,363,626 A | 12/1982 | Schmidt et al. |
| 4,365,376 A | 12/1982 | Oda et al. |
| 4,370,131 A | 1/1983 | Banko |
| 4,374,354 A | 2/1983 | Petrovic et al. |
| 4,382,167 A | 5/1983 | Maruyama et al. |
| 4,382,786 A | 5/1983 | Lohn |
| D270,000 S | 8/1983 | Ketler |

(56) References Cited

U.S. PATENT DOCUMENTS

| | | | |
|---|---|---|---|
| 4,412,823 A | 11/1983 | Sakai et al. |
| 4,416,628 A | 11/1983 | Cammack |
| 4,442,830 A | 4/1984 | Markau |
| 4,442,831 A | 4/1984 | Trenary |
| 4,452,238 A | 6/1984 | Kerr |
| 4,454,866 A | 6/1984 | Fayen |
| 4,512,769 A | 4/1985 | Kozam et al. |
| 4,517,962 A | 5/1985 | Heckele |
| 4,531,912 A | 7/1985 | Schuss et al. |
| 4,531,913 A | 7/1985 | Taguchi |
| 4,534,340 A | 8/1985 | Kerr et al. |
| 4,552,130 A | 11/1985 | Kinoshita |
| 4,561,214 A | 12/1985 | Inoue |
| D283,374 S | 4/1986 | Cheuk-Yiu |
| 4,585,415 A | 4/1986 | Hommann |
| 4,591,777 A | 5/1986 | McCarty et al. |
| 4,592,728 A | 6/1986 | Davis |
| 4,602,906 A | 7/1986 | Grunenfelder |
| 4,607,627 A | 8/1986 | Leber et al. |
| 4,613,074 A | 9/1986 | Schulze |
| 4,619,009 A | 10/1986 | Rosenstatter |
| 4,619,612 A | 10/1986 | Weber et al. |
| 4,629,425 A | 12/1986 | Detsch |
| 4,636,198 A | 1/1987 | Stade |
| 4,642,037 A | 2/1987 | Fritchman |
| 4,644,937 A | 2/1987 | Hommann |
| 4,645,488 A | 2/1987 | Matukas |
| 4,647,831 A | 3/1987 | O'Malley et al. |
| 4,648,838 A | 3/1987 | Schlachter |
| 4,650,475 A | 3/1987 | Smith et al. |
| 4,655,198 A | 4/1987 | Hommann |
| 4,669,453 A | 6/1987 | Atkinson et al. |
| 4,672,953 A | 6/1987 | DiVito |
| 4,673,396 A | 6/1987 | Urbaniak |
| D291,354 S | 8/1987 | Camens |
| 4,691,589 A * | 9/1987 | Arakawa | F16F 9/12 |
| | | | 464/180 |
| 4,716,352 A | 12/1987 | Hurn et al. |
| 4,749,340 A | 6/1988 | Ikeda et al. |
| 4,770,632 A | 9/1988 | Ryder et al. |
| D298,565 S | 11/1988 | Kohler, Jr. et al. |
| 4,783,321 A | 11/1988 | Spence |
| 4,787,845 A | 11/1988 | Valentine |
| 4,787,847 A | 11/1988 | Martin et al. |
| 4,798,292 A | 1/1989 | Hauze |
| 4,803,974 A | 2/1989 | Powell |
| 4,804,364 A | 2/1989 | Dieras et al. |
| 4,818,229 A | 4/1989 | Vasile |
| 4,820,152 A | 4/1989 | Warrin et al. |
| 4,821,923 A | 4/1989 | Skorka |
| 4,824,368 A | 4/1989 | Hickman |
| 4,826,431 A | 5/1989 | Fujimura et al. |
| 4,827,551 A | 5/1989 | Maser et al. |
| 4,832,683 A | 5/1989 | Idemoto et al. |
| 4,854,869 A | 8/1989 | Lawhorn |
| 4,861,340 A | 8/1989 | Smith et al. |
| 4,862,876 A | 9/1989 | Lih-Sheng |
| 4,869,125 A * | 9/1989 | Saigusa | F16D 57/00 |
| | | | 464/180 |
| 4,869,720 A | 9/1989 | Chernack |
| 4,880,382 A | 11/1989 | Moret et al. |
| 4,886,452 A | 12/1989 | Lohn |
| 4,900,252 A | 2/1990 | Liefke et al. |
| 4,902,225 A | 2/1990 | Lohn |
| 4,903,687 A | 2/1990 | Lih-Sheng |
| 4,906,187 A | 3/1990 | Amadera |
| 4,907,744 A | 3/1990 | Jousson |
| 4,925,450 A | 5/1990 | Imonti et al. |
| 4,928,675 A | 5/1990 | Thornton |
| 4,930,660 A | 6/1990 | Porteous |
| 4,941,459 A | 7/1990 | Mathur |
| 4,950,159 A | 8/1990 | Hansen |
| 4,958,629 A | 9/1990 | Peace et al. |
| 4,958,751 A | 9/1990 | Curtis et al. |
| 4,959,199 A | 9/1990 | Brewer |
| 4,961,698 A | 10/1990 | Vlock |
| 4,966,551 A | 10/1990 | Betush |
| 4,969,874 A | 11/1990 | Michel et al. |
| 4,973,246 A | 11/1990 | Black |
| 4,973,247 A | 11/1990 | Varnes et al. |
| 4,973,250 A | 11/1990 | Milman |
| 4,975,054 A | 12/1990 | Esrock |
| 4,979,503 A | 12/1990 | Chernack |
| 4,979,504 A | 12/1990 | Mills |
| 4,989,590 A | 2/1991 | Baum et al. |
| 4,998,880 A | 3/1991 | Nerli |
| 5,013,241 A | 5/1991 | Von Gutfeld et al. |
| 5,014,884 A | 5/1991 | Wunsch |
| 5,019,054 A | 5/1991 | Clement et al. |
| 5,027,798 A | 7/1991 | Primiano |
| 5,029,576 A | 7/1991 | Evans, Sr. |
| 5,033,617 A | 7/1991 | Hartwein et al. |
| 5,033,961 A | 7/1991 | Kandler et al. |
| D318,918 S | 8/1991 | Hartwein |
| 5,046,486 A | 9/1991 | Grulke et al. |
| 5,049,071 A | 9/1991 | Davis et al. |
| 5,060,825 A | 10/1991 | Palmer et al. |
| 5,061,180 A | 10/1991 | Wiele |
| 5,062,795 A | 11/1991 | Woog |
| 5,064,168 A | 11/1991 | Raines et al. |
| D322,314 S | 12/1991 | Ohbayashi |
| 5,071,346 A | 12/1991 | Domaas |
| 5,082,115 A | 1/1992 | Hutcheson |
| 5,082,443 A | 1/1992 | Lohn |
| 5,085,317 A | 2/1992 | Jensen et al. |
| 5,086,756 A | 2/1992 | Powell |
| 5,093,764 A * | 3/1992 | Hasegawa | G05G 1/105 |
| | | | 116/202 |
| 5,095,893 A | 3/1992 | Rawden, Jr. |
| 5,098,291 A | 3/1992 | Curtis et al. |
| 5,098,676 A | 3/1992 | Brooks, Jr. |
| 5,100,319 A | 3/1992 | Baum |
| 5,117,871 A | 6/1992 | Gardner et al. |
| 5,125,835 A | 6/1992 | Young |
| 5,127,831 A | 7/1992 | Bab |
| 5,142,723 A | 9/1992 | Lustig et al. |
| 5,150,841 A | 9/1992 | Silvenis et al. |
| 5,172,810 A | 12/1992 | Brewer |
| 5,173,273 A | 12/1992 | Brewer |
| 5,183,035 A | 2/1993 | Weir |
| 5,197,458 A | 3/1993 | Ito et al. |
| 5,197,460 A | 3/1993 | Ito et al. |
| 5,199,871 A | 4/1993 | Young |
| 5,203,697 A | 4/1993 | Malmin |
| 5,203,769 A | 4/1993 | Clement et al. |
| 5,204,004 A | 4/1993 | Johnston et al. |
| 5,208,933 A | 5/1993 | Lustig et al. |
| 5,215,193 A | 6/1993 | Dennis |
| 5,218,956 A | 6/1993 | Handler et al. |
| 5,220,914 A | 6/1993 | Thompson |
| 5,228,646 A | 7/1993 | Raines |
| 5,230,624 A | 7/1993 | Wolf et al. |
| 5,232,687 A | 8/1993 | Geimer |
| 5,235,968 A | 8/1993 | Woog |
| 5,241,714 A | 9/1993 | Barry |
| 5,246,367 A | 9/1993 | Ito et al. |
| 5,252,064 A | 10/1993 | Baum et al. |
| D341,200 S | 11/1993 | Yoshimoto |
| 5,257,933 A | 11/1993 | Jousson |
| 5,261,448 A | 11/1993 | Furuya et al. |
| D341,943 S | 12/1993 | Si-Hoe |
| 5,267,586 A | 12/1993 | Jankavaara |
| 5,269,684 A | 12/1993 | Fischer |
| 5,281,137 A | 1/1994 | Jousson |
| 5,281,139 A | 1/1994 | Frank et al. |
| 5,282,745 A | 2/1994 | Wiltrout et al. |
| 5,286,192 A | 2/1994 | Dixon |
| 5,286,201 A | 2/1994 | Yu |
| 5,295,832 A | 3/1994 | Evans |
| 5,297,962 A | 3/1994 | O'Connor et al. |
| D346,212 S | 4/1994 | Hosl |
| 5,301,381 A | 4/1994 | Klupt |
| 5,302,123 A | 4/1994 | Bechard |
| 5,317,691 A | 5/1994 | Traeger |

(56) References Cited

U.S. PATENT DOCUMENTS

| | | |
|---|---|---|
| 5,321,865 A | 6/1994 | Kaeser |
| 5,331,704 A | 7/1994 | Rosen et al. |
| 5,344,317 A | 9/1994 | Pacher et al. |
| 5,346,677 A | 9/1994 | Risk |
| D351,892 S | 10/1994 | Wolf et al. |
| 5,360,338 A | 11/1994 | Waggoner |
| 5,368,548 A | 11/1994 | Jousson |
| 5,370,534 A | 12/1994 | Wolf et al. |
| D354,168 S | 1/1995 | Hartwein |
| D354,559 S | 1/1995 | Knute |
| 5,378,149 A | 1/1995 | Stropko |
| 5,380,201 A | 1/1995 | Kawata |
| D356,864 S | 3/1995 | Woog |
| 5,399,089 A | 3/1995 | Eichman et al. |
| D358,883 S | 5/1995 | Vos |
| 5,456,672 A | 10/1995 | Diederich et al. |
| 5,465,445 A | 11/1995 | Yeh |
| 5,467,495 A | 11/1995 | Boland et al. |
| 5,468,148 A | 11/1995 | Ricks |
| 5,470,305 A | 11/1995 | Arnett et al. |
| 5,474,450 A | 12/1995 | Chronister |
| 5,474,451 A | 12/1995 | Dalrymple et al. |
| 5,476,379 A | 12/1995 | Disel |
| 5,484,281 A | 1/1996 | Renow et al. |
| 5,487,877 A | 1/1996 | Choi |
| 5,490,779 A | 2/1996 | Malmin |
| 5,505,916 A | 4/1996 | Berry, Jr. |
| 5,506,378 A * | 4/1996 | Goldenberg ............. H01H 3/08 200/292 |
| D369,656 S | 5/1996 | Vos |
| D370,125 S | 5/1996 | Craft et al. |
| 5,525,058 A | 6/1996 | Gallant et al. |
| 5,526,841 A | 6/1996 | Detsch et al. |
| 5,540,587 A | 7/1996 | Malmin |
| 5,547,374 A | 8/1996 | Coleman |
| D373,631 S | 9/1996 | Maeda et al. |
| 5,554,014 A | 9/1996 | Becker |
| 5,554,025 A | 9/1996 | Kinsel |
| 5,556,001 A | 9/1996 | Weissman et al. |
| 5,564,629 A | 10/1996 | Weissman et al. |
| D376,893 S | 12/1996 | Gornet |
| D377,091 S | 12/1996 | Scott, Sr. |
| 5,605,208 A * | 2/1997 | Friedrichsen ............. F16F 7/04 188/130 |
| 5,613,259 A | 3/1997 | Craft et al. |
| 5,616,028 A | 4/1997 | Hafele et al. |
| 5,626,472 A | 5/1997 | Pennetta |
| 5,634,791 A | 6/1997 | Matsuura et al. |
| 5,636,987 A | 6/1997 | Serfaty |
| 5,640,735 A | 6/1997 | Manning |
| D382,407 S | 8/1997 | Craft et al. |
| 5,653,591 A | 8/1997 | Loge |
| 5,659,995 A | 8/1997 | Hoffman |
| 5,667,483 A | 9/1997 | Santos |
| D386,576 S | 11/1997 | Wang et al. |
| 5,683,192 A | 11/1997 | Kilfoil |
| 5,685,829 A | 11/1997 | Allen |
| 5,685,851 A | 11/1997 | Murphy et al. |
| 5,697,784 A | 12/1997 | Hafele et al. |
| D388,612 S | 1/1998 | Stutzer et al. |
| D388,613 S | 1/1998 | Stutzer et al. |
| D389,091 S | 1/1998 | Dickinson |
| 5,709,545 A | 1/1998 | Johnston et al. |
| D390,934 S | 2/1998 | McKeone |
| 5,716,007 A | 2/1998 | Nottingham et al. |
| 5,718,668 A | 2/1998 | Arnett et al. |
| 5,746,595 A | 5/1998 | Ford |
| 5,749,726 A | 5/1998 | Kinsel |
| 5,759,502 A | 6/1998 | Spencer et al. |
| 5,779,471 A | 7/1998 | Tseng et al. |
| 5,779,654 A | 7/1998 | Foley et al. |
| 5,795,153 A | 8/1998 | Rechmann |
| 5,796,325 A | 8/1998 | Lundell et al. |
| 5,833,065 A | 11/1998 | Burgess |
| 5,836,030 A | 11/1998 | Hazeu et al. |
| D402,744 S | 12/1998 | Zuege |
| 5,851,079 A | 12/1998 | Horstman et al. |
| D403,511 S | 1/1999 | Serbinski |
| D406,334 S | 3/1999 | Rosenthal et al. |
| 5,876,201 A | 3/1999 | Wilson et al. |
| D408,511 S | 4/1999 | Allen et al. |
| 5,901,397 A | 5/1999 | Häfele et al. |
| 5,934,902 A | 8/1999 | Abahusayn |
| D413,975 S | 9/1999 | Maeda |
| D416,999 S | 11/1999 | Miyamoto |
| D417,082 S | 11/1999 | Classen et al. |
| 5,993,402 A | 11/1999 | Sauer et al. |
| 6,030,215 A | 2/2000 | Ellion et al. |
| 6,038,960 A | 3/2000 | Fukushima et al. |
| 6,039,180 A | 3/2000 | Grant |
| 6,047,429 A | 4/2000 | Wu |
| D424,181 S | 5/2000 | Caplow |
| D425,615 S | 5/2000 | Bachman et al. |
| D425,981 S | 5/2000 | Bachman et al. |
| 6,056,710 A | 5/2000 | Bachman et al. |
| D426,633 S | 6/2000 | Bachman et al. |
| 6,089,865 A | 7/2000 | Edgar |
| 6,116,866 A | 9/2000 | Tomita et al. |
| 6,120,755 A | 9/2000 | Jacobs |
| 6,124,699 A | 9/2000 | Suzuki et al. |
| D434,500 S | 11/2000 | Pollock et al. |
| 6,159,006 A | 12/2000 | Cook et al. |
| 6,164,967 A | 12/2000 | Sale et al. |
| D435,905 S | 1/2001 | Bachman et al. |
| D437,049 S | 1/2001 | Hartwein |
| 6,193,512 B1 | 2/2001 | Wallace |
| 6,193,932 B1 | 2/2001 | Wu et al. |
| 6,199,239 B1 | 3/2001 | Dickerson |
| 6,200,134 B1 | 3/2001 | Kovac |
| D439,781 S | 4/2001 | Spore |
| 6,217,835 B1 | 4/2001 | Riley et al. |
| D441,861 S | 5/2001 | Hafliger |
| 6,233,773 B1 | 5/2001 | Karge et al. |
| 6,234,205 B1 | 5/2001 | D'Amelio et al. |
| 6,237,178 B1 | 5/2001 | Krammer et al. |
| 6,247,929 B1 | 6/2001 | Bachman et al. |
| 6,280,190 B1 | 8/2001 | Hoffman |
| D448,236 S | 9/2001 | Murray |
| 6,293,792 B1 | 9/2001 | Hanson |
| D449,884 S | 10/2001 | Tobin et al. |
| D453,453 S | 2/2002 | Lun |
| D455,201 S | 4/2002 | Jones |
| D455,203 S | 4/2002 | Jones |
| 6,363,565 B1 | 4/2002 | Paffrath |
| D457,949 S | 5/2002 | Krug |
| D464,799 S | 10/2002 | Crossman et al. |
| 6,468,482 B1 | 10/2002 | Frieze et al. |
| 6,471,648 B1 * | 10/2002 | Gamelsky ................ A61B 8/00 600/437 |
| 6,475,173 B1 | 11/2002 | Bachman et al. |
| 6,485,451 B1 | 11/2002 | Roberts et al. |
| 6,497,375 B1 | 12/2002 | Srinath et al. |
| 6,497,572 B2 | 12/2002 | Hood et al. |
| 6,502,584 B1 | 1/2003 | Fordham |
| D470,660 S | 2/2003 | Schaber |
| 6,558,344 B2 | 5/2003 | McKinnon et al. |
| 6,561,808 B2 | 5/2003 | Neuberger et al. |
| D475,346 S | 6/2003 | McCurrach et al. |
| D476,743 S | 7/2003 | D'Silva |
| 6,589,477 B1 | 7/2003 | Frieze et al. |
| 6,602,071 B1 | 8/2003 | Ellion et al. |
| 6,632,091 B1 | 10/2003 | Cise et al. |
| D482,451 S | 11/2003 | Page et al. |
| 6,640,999 B2 | 11/2003 | Peterson |
| 6,647,577 B2 | 11/2003 | Tam |
| 6,659,674 B2 | 12/2003 | Carlucci et al. |
| 6,669,059 B2 | 12/2003 | Mehta |
| D484,971 S | 1/2004 | Hartwein |
| 6,681,418 B1 | 1/2004 | Bierend |
| D486,573 S | 2/2004 | Callaghan et al. |
| 6,689,078 B1 | 2/2004 | Rehkemper et al. |
| 6,699,208 B2 | 3/2004 | Bachman et al. |
| 6,719,561 B2 | 4/2004 | Gugel et al. |
| D489,183 S | 5/2004 | Akahori et al. |

(56) References Cited

U.S. PATENT DOCUMENTS

| | | |
|---|---|---|
| 6,739,782 B1 | 5/2004 | Rehkemper et al. |
| 6,740,053 B2 | 5/2004 | Kaplowitz |
| D490,899 S | 6/2004 | Gagnon |
| D491,728 S | 6/2004 | Jimenez |
| D492,996 S | 7/2004 | Rehkemper et al. |
| 6,761,324 B2 | 7/2004 | Chang |
| 6,766,549 B2 | 7/2004 | Klupt |
| D495,142 S | 8/2004 | Berde |
| D495,143 S | 8/2004 | Berde |
| 6,779,216 B2 | 8/2004 | Davies et al. |
| 6,783,004 B1 | 8/2004 | Rinner |
| 6,783,505 B1 | 8/2004 | Lai |
| 6,796,796 B2 | 9/2004 | Segal |
| D498,643 S | 11/2004 | Pryor |
| 6,814,259 B1 | 11/2004 | Foster et al. |
| D499,885 S | 12/2004 | Xi |
| 6,835,181 B2 | 12/2004 | Hippensteel |
| D500,599 S | 1/2005 | Callaghan |
| 6,837,708 B2 | 1/2005 | Chen et al. |
| 6,884,069 B2 | 4/2005 | Goldman |
| 6,902,337 B1 | 6/2005 | Kuo |
| 6,907,879 B2 | 6/2005 | Drinan et al. |
| D509,585 S | 9/2005 | Kling et al. |
| 6,968,929 B2 * | 11/2005 | Doornbos ............... F16D 57/00 188/290 |
| D513,638 S | 1/2006 | Pan |
| D515,215 S | 2/2006 | Wang |
| D522,652 S | 6/2006 | Massey |
| 7,080,980 B2 | 7/2006 | Klupt |
| D529,661 S | 10/2006 | Schmidt |
| D530,010 S | 10/2006 | Luettgen et al. |
| 7,117,555 B2 | 10/2006 | Fattori et al. |
| D532,570 S | 11/2006 | Vizcarra |
| 7,131,838 B2 | 11/2006 | Suzuki et al. |
| D533,720 S | 12/2006 | Vu |
| D538,474 S | 3/2007 | Sheppard et al. |
| D548,334 S | 8/2007 | Izumi |
| D550,097 S | 9/2007 | Lepoitevin |
| D553,980 S | 10/2007 | VerWeyst |
| 7,276,035 B2 | 10/2007 | Lu |
| 7,314,456 B2 | 1/2008 | Shaw |
| D565,175 S | 3/2008 | Boyd et al. |
| 7,344,510 B1 | 3/2008 | Yande |
| D565,713 S | 4/2008 | Gao |
| 7,367,803 B2 | 5/2008 | Egeresi |
| D574,952 S | 8/2008 | Boyd et al. |
| D577,198 S | 9/2008 | Jimenez |
| D577,814 S | 9/2008 | Seki et al. |
| D581,279 S | 11/2008 | Oates |
| 7,455,521 B2 | 11/2008 | Fishburne, Jr. |
| 7,469,440 B2 | 12/2008 | Boland et al. |
| D585,132 S | 1/2009 | Pukall |
| D588,262 S | 3/2009 | Pukall |
| 7,500,584 B2 | 3/2009 | Schutz |
| D590,492 S | 4/2009 | Powell |
| D592,748 S | 5/2009 | Boulton |
| D595,136 S | 6/2009 | Canamasas Puigbo |
| D601,694 S | 10/2009 | Rocklin |
| D601,697 S | 10/2009 | Sobeich et al. |
| D603,708 S | 11/2009 | Handy |
| D608,430 S | 1/2010 | Slothower |
| 7,670,141 B2 | 3/2010 | Thomas et al. |
| 7,677,888 B1 | 3/2010 | Halm |
| D613,550 S | 4/2010 | Picozza et al. |
| D621,949 S | 8/2010 | Seki et al. |
| D622,928 S | 9/2010 | Griebel |
| D623,376 S | 9/2010 | Griebel |
| D625,406 S | 10/2010 | Seki et al. |
| 7,814,585 B1 | 10/2010 | Reich |
| D629,884 S | 12/2010 | Stephens |
| 7,857,623 B2 | 12/2010 | Grez |
| 7,862,536 B2 | 1/2011 | Chen et al. |
| 7,959,597 B2 | 6/2011 | Baker et al. |
| D640,872 S | 7/2011 | Nanda |
| D648,539 S | 11/2011 | Wai |
| D651,409 S | 1/2012 | Papenfu |
| D651,805 S | 1/2012 | Hay |
| D653,340 S | 1/2012 | Goerge et al. |
| 8,113,832 B2 | 2/2012 | Snyder et al. |
| D655,380 S | 3/2012 | Taylor |
| D658,381 S | 5/2012 | Gebski |
| D658,538 S | 5/2012 | Korzeniowski |
| 8,220,726 B2 | 7/2012 | Qiu et al. |
| D666,912 S | 9/2012 | Kawai |
| 8,256,979 B2 | 9/2012 | Hilscher et al. |
| D668,339 S | 10/2012 | Luoto |
| D669,169 S | 10/2012 | Washington et al. |
| 8,297,534 B2 | 10/2012 | Li et al. |
| D670,373 S | 11/2012 | Taylor et al. |
| D670,958 S | 11/2012 | Picozza et al. |
| D671,637 S | 11/2012 | Gebski et al. |
| D672,018 S | 12/2012 | Bucher |
| 8,366,024 B2 | 2/2013 | Leber et al. |
| 8,403,577 B2 | 3/2013 | Khoshnevis |
| 8,403,665 B2 | 3/2013 | Thomas et al. |
| 8,408,483 B2 | 4/2013 | Boyd et al. |
| D686,311 S | 7/2013 | Mori |
| D694,378 S | 11/2013 | Bates |
| D694,398 S | 11/2013 | Taylor |
| D700,343 S | 2/2014 | Liu |
| D702,819 S | 4/2014 | Garland |
| D702,821 S | 4/2014 | Garland |
| D707,350 S | 6/2014 | Woodard |
| D709,183 S | 7/2014 | Kemlein |
| D714,929 S | 10/2014 | Kim et al. |
| D714,930 S | 10/2014 | Kim et al. |
| D717,412 S | 11/2014 | Bucher |
| D717,427 S | 11/2014 | Kim |
| D718,855 S | 12/2014 | Kim et al. |
| D723,387 S | 3/2015 | Fath |
| D725,770 S | 3/2015 | Kim et al. |
| D731,640 S | 6/2015 | Kim et al. |
| D735,305 S | 7/2015 | Obara |
| 9,108,667 B2 * | 8/2015 | Hayama ................ B62D 1/043 |
| D740,936 S | 10/2015 | Kim et al. |
| D745,329 S | 12/2015 | Ong |
| D746,975 S | 1/2016 | Schenck |
| D747,464 S | 1/2016 | Taylor |
| D754,330 S | 4/2016 | Kim et al. |
| D756,122 S | 5/2016 | Taylor |
| D764,051 S | 8/2016 | Wang |
| D766,423 S | 9/2016 | Kim et al. |
| D772,396 S | 11/2016 | Kim et al. |
| D772,397 S | 11/2016 | Kim et al. |
| D774,651 S | 12/2016 | Kaib |
| D776,253 S | 1/2017 | Li |
| D782,326 S | 3/2017 | Fath |
| D782,656 S | 3/2017 | Au |
| D786,422 S | 5/2017 | Au |
| 2002/0090252 A1 | 7/2002 | Hall et al. |
| 2002/0108193 A1 | 8/2002 | Gruber |
| 2002/0119415 A1 | 8/2002 | Bailey |
| 2002/0152565 A1 | 10/2002 | Klupt |
| 2003/0060743 A1 | 3/2003 | Chang |
| 2003/0098249 A1 | 5/2003 | Rollock |
| 2003/0204155 A1 | 10/2003 | Egeresi |
| 2003/0213075 A1 | 11/2003 | Hui et al. |
| 2004/0045107 A1 | 3/2004 | Egeresi |
| 2004/0076921 A1 | 4/2004 | Gofman et al. |
| 2004/0122377 A1 | 6/2004 | Fischer et al. |
| 2004/0126730 A1 | 7/2004 | Panagotacos |
| 2004/0173691 A1 * | 9/2004 | Hall ...................... H01H 19/11 236/91 D |
| 2004/0209222 A1 | 10/2004 | Snyder |
| 2004/0210916 A1 * | 10/2004 | Hori ...................... G11B 19/16 720/600 |
| 2005/0049620 A1 | 3/2005 | Chang |
| 2005/0064371 A1 | 3/2005 | Soukos et al. |
| 2005/0101894 A1 | 5/2005 | Hippensteel |
| 2005/0102773 A1 | 5/2005 | Obermann et al. |
| 2005/0144745 A1 | 7/2005 | Russell |
| 2005/0177079 A1 | 8/2005 | Pan |
| 2005/0271531 A1 | 12/2005 | Brown et al. |
| 2006/0008373 A1 | 1/2006 | Schutz |

(56) References Cited

U.S. PATENT DOCUMENTS

| | | | |
|---|---|---|---|
| 2006/0010624 A1 | 1/2006 | Cleland | |
| 2006/0026784 A1 | 2/2006 | Moskovich et al. | |
| 2006/0057539 A1 | 3/2006 | Sodo | |
| 2006/0078844 A1 | 4/2006 | Goldman et al. | |
| 2006/0079818 A1 | 4/2006 | Yande | |
| 2006/0237294 A1* | 10/2006 | Greer ................. | H01H 1/5805 200/313 |
| 2007/0082316 A1 | 4/2007 | Zhadanov et al. | |
| 2007/0082317 A1 | 4/2007 | Chuang | |
| 2007/0113360 A1 | 5/2007 | Tsai | |
| 2007/0202459 A1 | 8/2007 | Boyd et al. | |
| 2007/0203439 A1 | 8/2007 | Boyd et al. | |
| 2007/0254260 A1 | 11/2007 | Alden | |
| 2008/0189951 A1 | 8/2008 | Molema et al. | |
| 2008/0213719 A1 | 9/2008 | Giniger et al. | |
| 2009/0070949 A1 | 3/2009 | Sagel et al. | |
| 2009/0082706 A1 | 3/2009 | Shaw | |
| 2009/0124945 A1 | 5/2009 | Reich et al. | |
| 2009/0163839 A1 | 6/2009 | Alexander | |
| 2009/0188780 A1 | 7/2009 | Watanabe | |
| 2009/0281454 A1 | 11/2009 | Baker et al. | |
| 2010/0010524 A1 | 1/2010 | Barrington | |
| 2010/0015566 A1 | 1/2010 | Shaw | |
| 2010/0190132 A1 | 7/2010 | Taylor et al. | |
| 2010/0239998 A1 | 9/2010 | Snyder et al. | |
| 2010/0261134 A1 | 10/2010 | Boyd et al. | |
| 2010/0261137 A1 | 10/2010 | Boyd et al. | |
| 2010/0326536 A1 | 12/2010 | Nan | |
| 2010/0330527 A1 | 12/2010 | Boyd et al. | |
| 2011/0027749 A1 | 2/2011 | Syed | |
| 2011/0076090 A1 | 3/2011 | Wu et al. | |
| 2011/0097683 A1 | 4/2011 | Boyd et al. | |
| 2011/0139826 A1 | 6/2011 | Hair et al. | |
| 2011/0144588 A1 | 6/2011 | Taylor et al. | |
| 2011/0184341 A1 | 7/2011 | Baker et al. | |
| 2011/0307039 A1 | 12/2011 | Cornell | |
| 2012/0021374 A1 | 1/2012 | Cacka et al. | |
| 2012/0045730 A1 | 2/2012 | Snyder et al. | |
| 2012/0064480 A1 | 3/2012 | Hegemann | |
| 2012/0077145 A1 | 3/2012 | Tsurukawa | |
| 2012/0141952 A1 | 6/2012 | Snyder et al. | |
| 2012/0179118 A1 | 7/2012 | Hair | |
| 2012/0189976 A1 | 7/2012 | McDonough et al. | |
| 2012/0266396 A1 | 10/2012 | Leung | |
| 2012/0277677 A1 | 11/2012 | Taylor et al. | |
| 2012/0277678 A1 | 11/2012 | Taylor et al. | |
| 2012/0279002 A1 | 11/2012 | Sokol et al. | |
| 2012/0295220 A1 | 11/2012 | Thomas et al. | |
| 2013/0295520 A1 | 11/2013 | Hsieh | |
| 2014/0106296 A1 | 4/2014 | Woodard et al. | |
| 2014/0193774 A1 | 7/2014 | Snyder et al. | |
| 2014/0259474 A1 | 9/2014 | Sokol et al. | |
| 2014/0272769 A1 | 9/2014 | Luettgen et al. | |
| 2014/0272782 A1 | 9/2014 | Luettgen et al. | |
| 2014/0352088 A1 | 12/2014 | Wu | |
| 2015/0004559 A1 | 1/2015 | Luettgen et al. | |
| 2015/0147717 A1 | 5/2015 | Taylor et al. | |
| 2015/0173850 A1 | 6/2015 | Garrigues et al. | |
| 2015/0182319 A1 | 7/2015 | Wagner et al. | |
| 2016/0100921 A1 | 4/2016 | Ungar | |
| 2016/0151133 A1 | 6/2016 | Luettgen et al. | |

FOREIGN PATENT DOCUMENTS

| | | |
|---|---|---|
| CN | 203657017 U | 6/2014 |
| CN | 203693807 U | 7/2014 |
| CN | 204049908 | 12/2014 |
| DE | 1466963 | 5/1969 |
| DE | 2019003 | 11/1971 |
| DE | 2409752 | 9/1975 |
| DE | 2545936 | 4/1977 |
| DE | 2714876 | 10/1978 |
| DE | 2910982 | 2/1980 |
| EP | 0023672 | 7/1980 |
| EP | 0515983 | 2/1992 |
| FR | 2556954 | 6/1985 |
| FR | 2654627 | 5/1991 |
| GB | 838564 | 6/1960 |
| GB | 1182031 | 2/1970 |
| GB | 2018605 | 10/1979 |
| JP | 2-134150 | 5/1990 |
| JP | 4-125404 | 11/1992 |
| JP | 2009-39455 | 2/2009 |
| KR | 20120126265 | 11/2012 |
| WO | WO95/016404 | 6/1995 |
| WO | WO01/10327 | 2/2001 |
| WO | WO04/021958 | 3/2004 |
| WO | WO04/039205 | 5/2004 |
| WO | WO2004/060259 | 7/2004 |
| WO | WO2004/062518 | 7/2004 |
| WO | WO2008/070730 | 6/2008 |
| WO | WO2008/157585 | 12/2008 |
| WO | WO2013/124691 | 8/2013 |
| WO | WO-2014160051 A2 * 10/2014 ........... A61C 17/028 |  |

OTHER PUBLICATIONS

The Right Tool, Electron Fusion Devices, Inc., 2 pages, at least as early as Feb. 1991.

Brochure: Woog International, "You have a 98% chance of getting gum disease. Unless you read this.", Lancaster, Pennsylvania, 5 pages, Feb. 1987.

Brochure: Woog International, "We put the control of home dental care back into the hands of the professional", Lancaster, Pennsylvania, 2 pages, Feb. 1987.

Brochure: Woog International, "Products at a Glance: Home Dental Care System" Woog Orajet, 3 pages, at least as early as Dec. 18, 1998.

Website: http://www.just4teeth.com/product/Panasonic/Panasonic_Portable_Irrigator.htm, 2 pages, at least as early as Jun. 20, 2003.

Website: http://www.videodirectstore.com/store/merchant.mv?Screen=PROD&Product_Code=EW1' . . . , 2 pages, at least as early as Jun. 20, 2003.

Website: http://products.consumerguide.com/cp/family/review/index.cfm/id/18742, 2 pages, at least as early as Jun. 20, 2003.

Website: http://www.racekarteng.com/images/walbroparts.gif and http://www.muller.net/mullermachine/docs/walbro1.html, 4 pages, at least as early as Jun. 20, 2003.

European Search Report, EPO Application No. 07250799.9, dated Jul. 5, 2007.

European Search Report, EPO Application No. 07252693.2, 14 pages, dated Apr. 28, 2008.

European Examination Report, EPO Application No. 07250799.9, dated Feb. 5, 2009.

International Search Report, Application No. PCT/US2010/028180, 2 pages, dated May 18, 2010.

International Search Report, PCT/US2010/060800, 2 pages, dated Feb. 11, 2011.

International Search Report, PCT/US2011/052795, 10 pages, dated Jan. 17, 2012.

Waterpik SinuSense Website: http://www.insightsbyapril.com/2012/03/waterpik-natural-remedy-for-sinus.html, 8 pages, retrieved on May 31, 2012.

Website: https://www.waterpik.com/about-us/, 3 pages.

Waterpik WP 350W Oral Irrigator. Dentist.net. Copyright date 2013. Date accessed: Mar. 30, 2017, 2 pages <http://www.dentalhoo.com/waterpik-wp350.asp>.

iPik Portable Oral Irrigator. AliExpress. Date reviewed: Oct. 5, 2016. <https://www.allexpress.com/...e-Oral-Care-Product-Nasal-Irrigator-Tooth-Flosser-Water/1525541997.html?aff_platform=aaf&cpt=1490913714609&sk=yfAeyJa&aff_trace_key=c5a300c4f02e46d08c042f5292e1762f-1490913714609-07517-yfAeyJa>, 18 pages.

Brite Leafs Professional Portable 2-in-1 Nasal Sinus & Oral Irrigator. Brite Leafs. Copyright date 2012, <http://www.briteleafs.com/product6.html> , 1 page.

Ali Express. Date reviewed: Jan. 12, 2017. <https://www.aliexpress.com/item/Cordless-Water-Floss-Portable-Oral-Irrigator-Dental-Water-

(56) References Cited

OTHER PUBLICATIONS

Flosser-Waterpic-Whatpick-Dental-Water-Pic-Whater-Pick/32769416341.html?spm=2114.40010308.4.75.0wuzfj>.

* cited by examiner

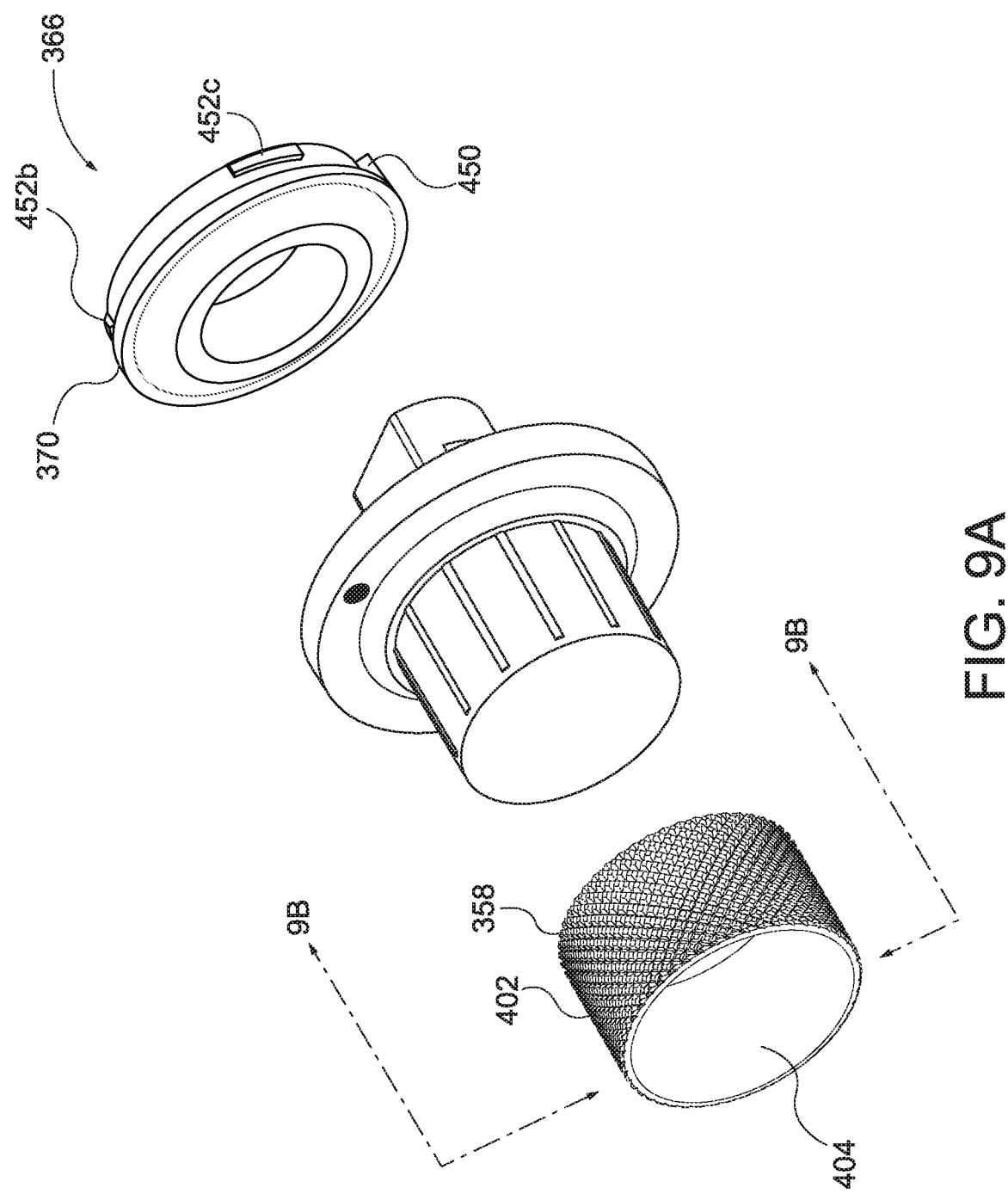

ACTUATION ASSEMBLY FOR AN ORAL IRRIGATOR

CROSS REFERENCE TO RELATED APPLICATIONS

This application claims the benefit of priority pursuant to 35 U.S.C. § 119(e) of U.S. provisional application No. 62/302,565 filed 2 Mar. 2016 entitled "Actuation assembly for an oral irrigator," which is hereby incorporated herein by reference in its entirety

TECHNICAL FIELD

The present disclosure relates generally to health and personal hygiene equipment and more particularly, to oral irrigators.

BACKGROUND

Oral irrigators are typically used to clean a user's teeth and gums by discharging a pressurized fluid stream into the oral cavity of a user. The fluid impacts the teeth and gums to remove debris. Many oral irrigator units include a reservoir that connects to a base unit housing the pump and other internal components. The fluid stored in the reservoir is pulled into the pump and pressurized to deliver the fluid to the tip of a handle. These units typically include a button, knob, or other mechanism actuated by a user to vary one or more characteristics of the oral irrigator, e.g., turn the power on or off, adjust the pressure of water expelled from the tip, etc. Conventional buttons and knobs for oral irrigators, however, are made of plastic, can be difficult to actuate when wet, and do not provide tactile feedback to a user when actuated.

The information included in this Background section of the specification, including any references cited herein and any description or discussion thereof, is included for technical reference purposes only and is not to be regarded subject matter by which the scope of the invention as defined in the claims is to be bound.

SUMMARY

In one implementation, an actuation assembly for an oral irrigator includes a bezel secured to or formed as part of a housing of the oral irrigator, an actuator operably connected to the bezel and moveable relative thereto, and an augmentation fluid positioned between the bezel and the actuator. The augmentation fluid modifies a frictional relationship between the bezel and the actuator to provide a predefined resistance force between the actuator and the bezel as the actuator is rotated relative to the bezel.

In another implementation, an oral irrigator includes a fluid reservoir and a housing configured to support the fluid reservoir. A pump may be positioned within the housing and have an inlet fluidly connected to the fluid reservoir and an outlet. A motor may also be positioned within the housing to drive the pump. A power source may further be positioned within the housing to provide electricity to the motor. An irrigator handle with a fluid outlet may be fluidly connected via a hose to the outlet of the pump. A first bezel may be secured to or formed as part of the housing and positioned about a first opening in the housing. A central aperture may be defined within the first bezel. A first actuator may be operably connected to the first bezel and moveable relative thereto. The first actuator may include a first boss that extends through the central aperture in the first bezel and the first opening in the housing and may be operably connected to a switch that actuates the power source. A first augmentation fluid may be positioned between the first bezel and the first actuator. The first augmentation fluid modifies a frictional relationship between the first bezel and the first actuator to provide a predefined resistance force between the first actuator and the first bezel as the first actuator is rotated relative to the first bezel.

The oral irrigator may further include a second bezel secured to or formed as part of the housing and positioned about a second opening in the housing. A central aperture may be defined within the second bezel. A second actuator may be operably connected to the second bezel and moveable relative thereto. The second actuator may include a second boss that extends through the central aperture in the second bezel and the second opening in the housing. The second boss may be operably connected to a valve that controls fluid pressure in the fluid traveling from the pump to the handle. A second augmentation fluid may be positioned between the second bezel and the second actuator. The second augmentation fluid modifies a frictional relationship between the second bezel and the second actuator to provide a predefined resistance force between the second actuator and the second bezel as the second actuator is rotated relative to the second bezel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 9A is an exploded view of the second actuation assembly of FIG. 7A.

DETAILED DESCRIPTION

Figure 1:
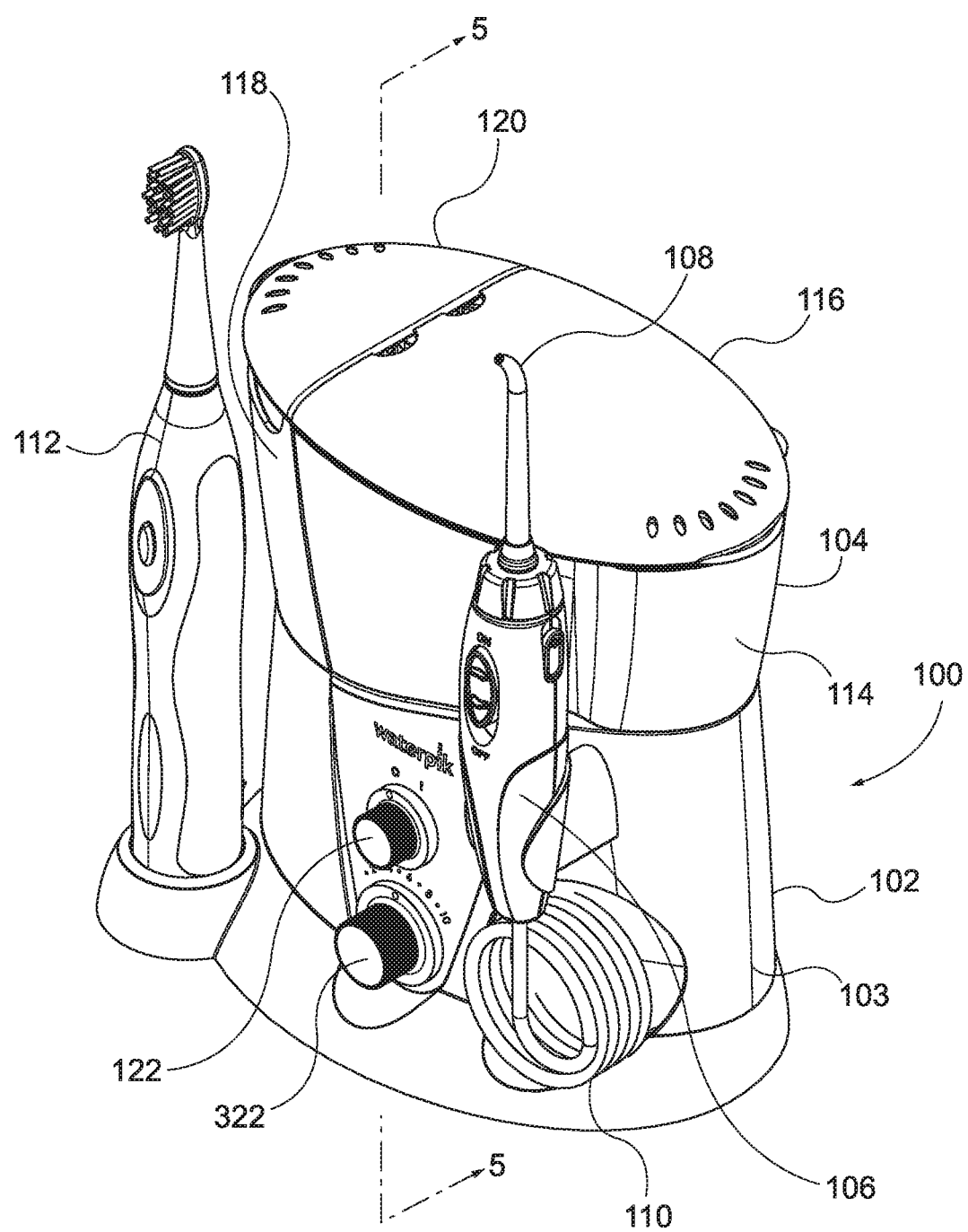
FIG. 1 is a front isometric view of an oral irrigator.

An example of the present disclosure includes an oral irrigator having one or more user actuation assemblies for selecting or adjusting characteristics (e.g., pressure, power, etc.) of the oral irrigator or the fluid output thereof. Each actuation assembly may include a bezel, an actuator, a grip enhancement surface, and an augmentation fluid positioned between the actuator and the bezel that enhances the tactile feel of the actuation assembly, provides feedback to the user, provides shock absorption, and varies the perceived interaction forces between the knob and the internal components of the oral irrigator.

For example, in some embodiments, as a user operates the actuator, an initial force spike transmitted from the user to the actuator assembly is absorbed by the augmenting fluid, dampening the force and creating a soft feel for the user. When the user reaches a desired adjustment and stops the movement of the actuator, the augmentation fluid absorbs a portion of the force such that the user experiences a soft stop.

The user actuation assembly also acts to reduce noise of the oral irrigator. Typical knobs and buttons for oral irrigators create noise as they are actuated by a user and/or transmit noise from the interior operating components of the irrigator (e.g., pump, motor, etc.) to the outside of the irrigator housing. The augmentation fluid of the user actuation assembly reduces noise by preventing or dampening sound waves [transmission of] through the actuation assembly to the outside of the oral irrigator unit. The augmentation fluid also reduces frictional interaction between various components within the actuation assembly, which further reduces noise.

The augmentation fluid characteristics, the form of a gap between the bezel and actuator in which the augmentation fluid is received, or both, can be modified to vary the user experience. For example, changing the viscosity of the augmentation fluid can result in a softer feel by the user. As another example, varying the gap between the two components can create a softer or stronger feel for the user. The augmentation fluid may increase the force required by a user to turn or actuate the knob, creating an appearance of a "high end" actuator that may "feel" like it is manufactured out of more expensive materials, such as metals, rather than plastics.

Additionally, the bezel and actuator may each include curved interaction surfaces that interface with one another via the augmentation fluid. The interaction surfaces are curved so as to reduce noise as the actuator rotates relative to the bezel. In an embodiment, the bezel interaction surface may be concavely curved whereas the actuator interaction surface may be convexly curved and the augmentation fluid may be positioned between the two surfaces. The curvature reduces noise as the actuator is rotated, and generates a desired feel for the actuator. In instances where the interaction surfaces are planar or uncomplimentary to one another, the actuator will create noise as it is turned, which is undesirable. On the contrary, using a complementary bell shape (e.g., two mating arcs where one is convex and the other is concave) reduces noise as the actuator is turned, providing an enhanced user experience.

In some embodiments, the oral irrigator includes two user actuation assemblies. In these embodiments, a first actuation assembly may control the electrical power to turn the unit on or off, where rotation in a first direction activates the oral irrigator and rotation in a second direction deactivates the oral irrigator. A second actuation assembly may control the fluid pressure of the irrigator, such that rotation of the actuator in a first direction increases the pressure and rotation in a second direction decreases the pressure.

Additionally, in some embodiments, the user actuation assembly includes a grip enhancement member. The grip enhancement member increases the frictional contact between the user and the actuation assembly to allow a user to more easily actuate the actuator. Oral irrigators are typically operated in wet environments, such as bathrooms, and buttons can be difficult to grasp when wet, making it difficult for a user to actuate a particular button or function of the oral irrigator. The grip enhancement member allows a user, even with wet hands, in instances where the enhancement member is wet, to easily move the actuation assembly in a desired manner. Additionally, in some embodiments, the actuator may be plastic or a similar material and the grip enhancement member may be a metal formed sleeve with a textured surface, which allows the user to interact with a frictional interface, making grasping and manipulating easier. Furthermore, as the augmentation fluid increases the friction between the actuator and the bezel, the actuator may require additional force to operate. The grip enhancement member increases the traction between a user's fingers and the actuator to allow a user to more easily rotate (or otherwise manipulate) the actuator.

Figure 2:
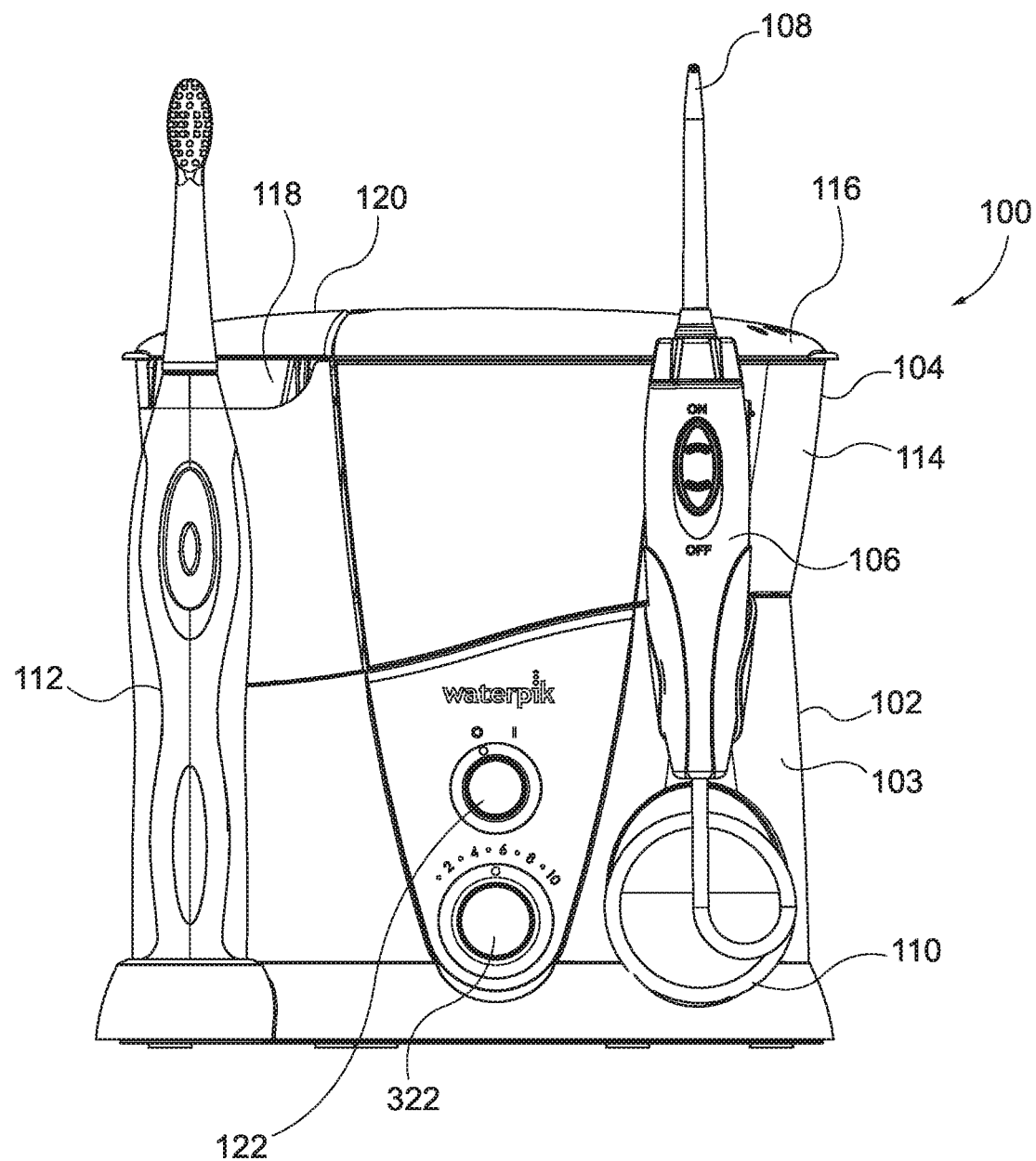
FIG. 2 is a front elevation view of the oral irrigator of FIG. 1.

With reference now to the figures, the oral irrigator of the present disclosure will be discussed in more detail. FIGS. 1 and 2 illustrate various views of an oral irrigator. With reference to FIGS. 1 and 2, the oral irrigator 100 includes a base 102, a reservoir 104, a handle 106, connection to the handle 106, a tip 108, a hose 110 fluidly connecting the handle 106 to the base 102, a first actuation assembly 122, and a second actuation assembly 322. It should be noted that the oral irrigator unit shown in FIGS. 1 and 2 may be a "complete care" unit and include an optional electric toothbrush 112 therewith. However, in many embodiments, the toothbrush 112 may be omitted. Each of the main components of the oral irrigator 100 will be discussed, in turn, below, but it should be noted that many other types of oral irrigators and internal components (e.g., motors, pumps, etc.) may be used with the actuation assemblies 122, 322 and the below discussion is meant as illustrative only.

With reference to FIGS. 1 and 2, the reservoir 104 stores fluid, such as water, for use with the oral irrigator 100. The reservoir 104 includes a fluid container compartment 114 that may include a lid 116 positioned on the top edge to help prevent debris from falling into the fluid. The reservoir 104 is typically seated on the base 102 and is fluidly connected to the handle 106 through the hose 110.

In some embodiments, the oral irrigator 100 may include a storage compartment 118 with a storage lid 120. The storage compartment 118 may be used to house different tips 108 for the handle 106, such as ones for different users, different pressures, or that include brush heads or the like. As shown in FIGS. 1 and 2, the tip storage compartment 118 is located adjacent to and formed partly with the reservoir 104. However, in other embodiments, the storage compartment 118 may be defined within the reservoir lid 116 or the like.

The handle 106 is fluidly connected to the reservoir 104 and is configured to be grasped by a user to direct fluid pumped from the reservoir 104 into the user's mouth. The tip 108 is connected to the handle 106 and may be releasable therefrom.

The base 102 is defined by a housing 103 that supports the reservoir 104, the storage compartment 118, the toothbrush 112, and the handle 106. The housing 103 forms a shell or exterior of the oral irrigator 100 and houses the various internal components that drive the oral irrigator 100. The housing 103 may be made as a single element or may be formed of multiple components secured together. The actuation assemblies 122, 322 are connected to the housing 103 and extend through apertures in the housing 103 to the interior of the base 102 to actuate mechanisms of the oral irrigator 100 that are housed within the base 102. FIGS. 3A-5 illustrate various views of the internal components of the base 102. The internal components may include a pump assembly 128, a pressure assembly 130, a control housing 140, and a power assembly 144. The first actuation assembly 122 engages with and controls the power assembly 144 and thus the pump assembly 128, and the second actuation assembly 322 engages with and controls the pressure assembly 130 to vary the pressure of the fluid pumped to the handle 106 from the assembly 128.

The pump assembly 128 pumps fluid from the reservoir 104 to the tip 108 and may include a motor 126, a pump inlet 134, a pump body 136, a chassis 132, a gear assembly cover 138, and one or more pump valves 135 for regulating flow into and out of the pump body 136. The pump assembly 128 may be substantially any type of pumping element and include desired components for actuating fluid flow from the reservoir 104 to the tip 108. For example, the pump assembly 128 may include a connecting rod, piston, and gear assembly (not shown, housed beneath the gear assembly cover 138) that are interconnected together and to the motor 126 to alternatively pull a vacuum force to fill the pump body 136 with fluid from the reservoir 104 and exert a push force to dispel the fluid from the pump body 136 towards the tip 108. Examples of pump assemblies 128 that can be used are disclosed in U.S. patent application Ser. No. 11/361,749 entitled "Storage Container for Water Jet Reservoir"; and Ser. No. 14/956,017 titled "Oral Irrigator", both of which are incorporated by reference herein.

The pressure assembly 130 adjusts the fluid pressure after output by the pump assembly 128. In some embodiments, the pressure assembly 130 may be an electronic control and vary the voltage applied to the motor 128 of the pump to electronically reduce the pressure of the pump assembly 128 (see, e.g., U.S. patent application Ser. No. 14/208,806 entitled "Oral Irrigator with Integrated Lid and Base", which is hereby incorporated by reference herein). In other embodiments, the pressure assembly 130 mechanically changes one or more characteristics of a flow path of fluid in the pump body 136, such as by including a bypass channel, to reduce or increase the pressure (see, e.g., U.S. patent application Ser. No. 11/361,749 entitled "Storage Container for Water Jet Reservoir"). In the embodiment shown in FIGS. 3-A5, the pressure assembly 130 is a manual control and includes a pressure valve 150 that is rotated to selectively siphon fluid via a bypass channel 139 from the pump body 136. The pressure assembly 130 may also include a seal valve 152 that seals against the pressure valve 150, as well as one or more sealing members, such as O-rings 154, 156 that ensure tight connections and help to prevent fluid from leaking around components.

Figure 3A:
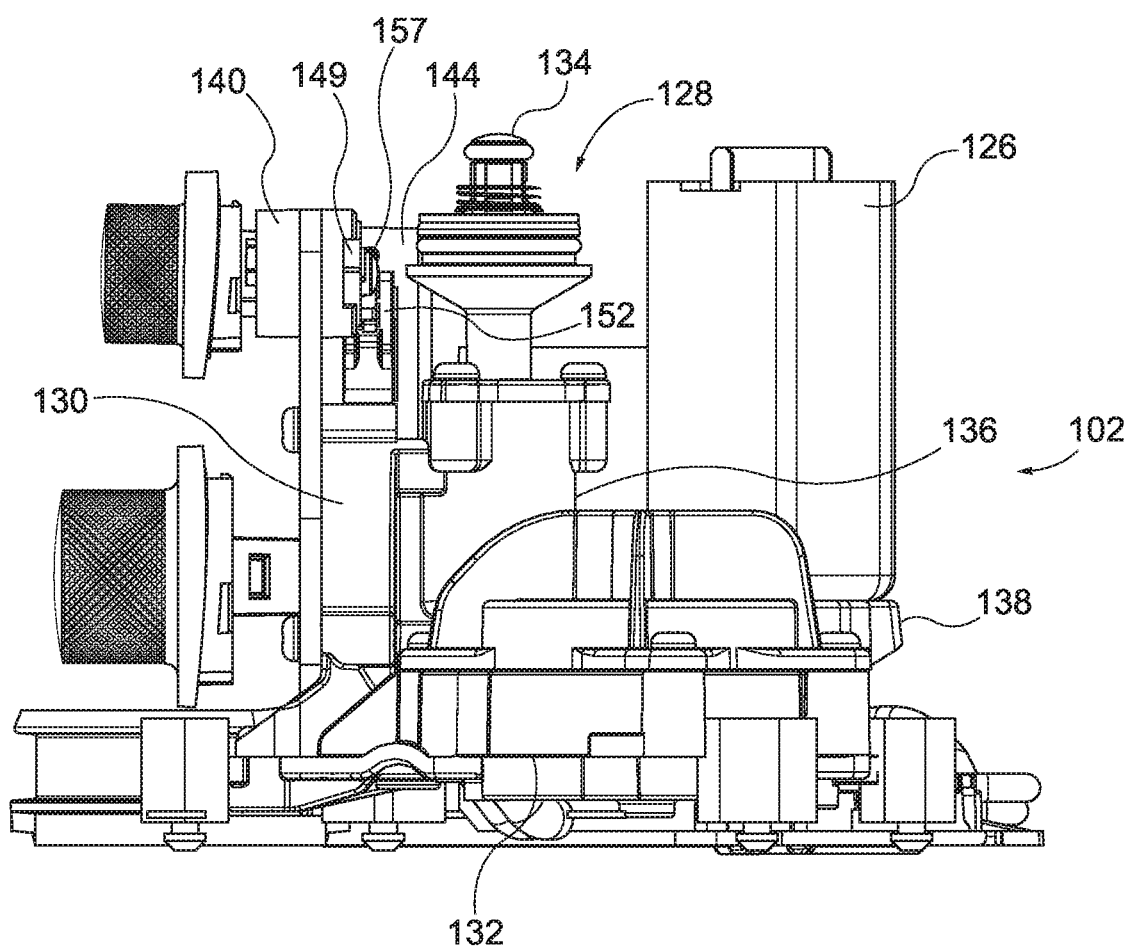
FIG. 3A is a simplified right side elevation view of fluid management components of the oral irrigator of FIG. 1 with select components hidden for clarity.
Figure 3B:
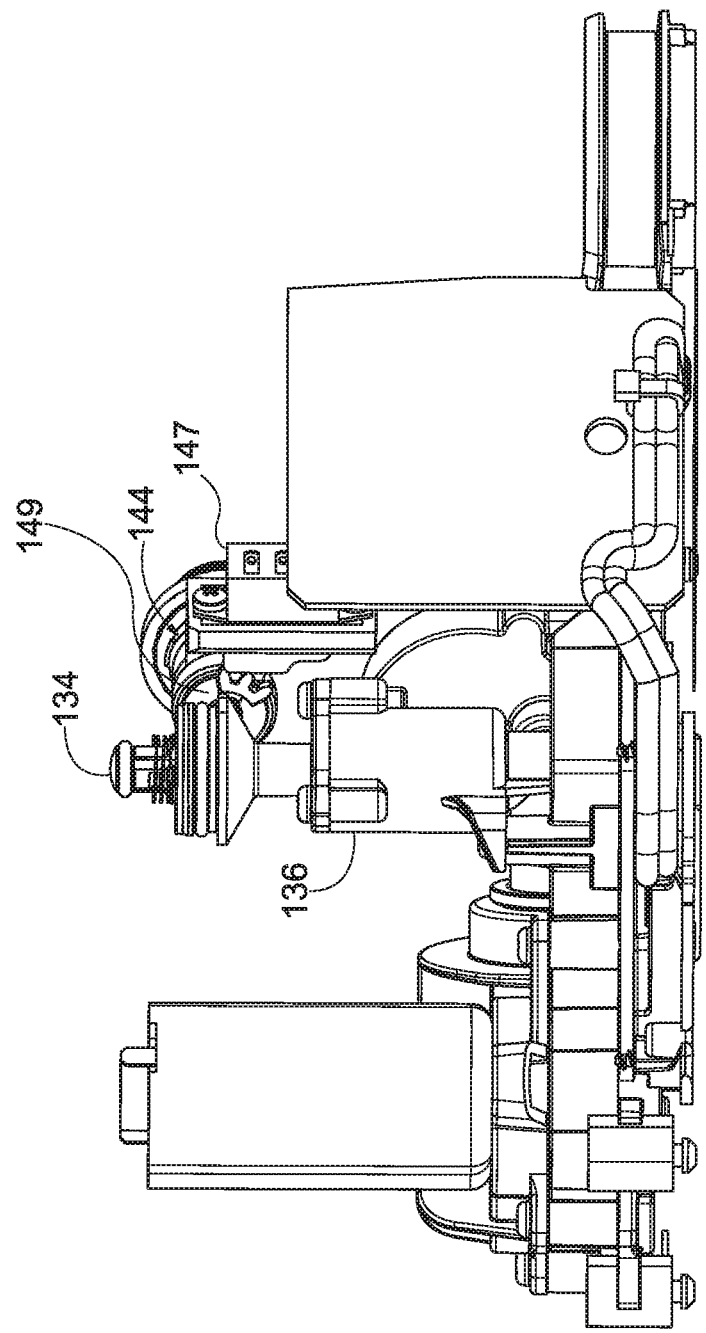
FIG. 3B is a rear isometric view of the oral irrigator of FIG. 3A.
Figure 3C:
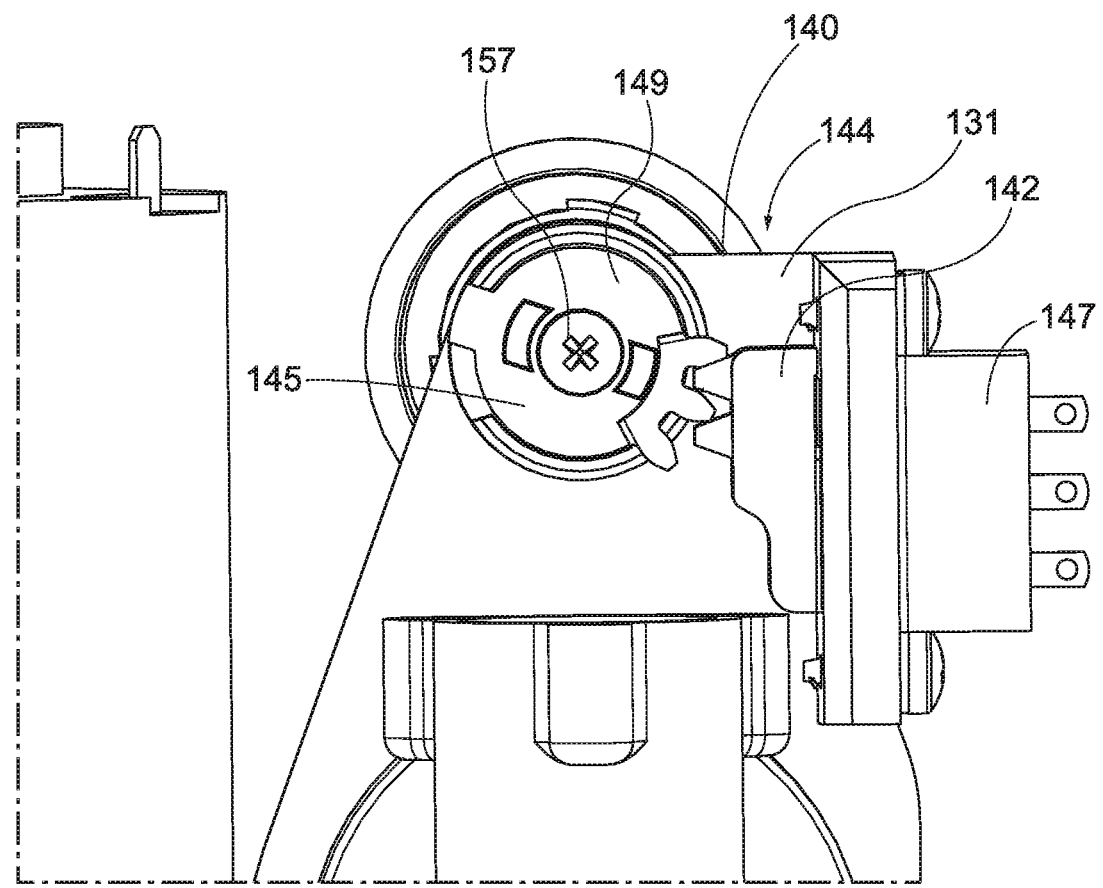
FIG. 3C is a partial view of the power assembly components of an oral irrigator of FIG. 3A.
Figure 4:
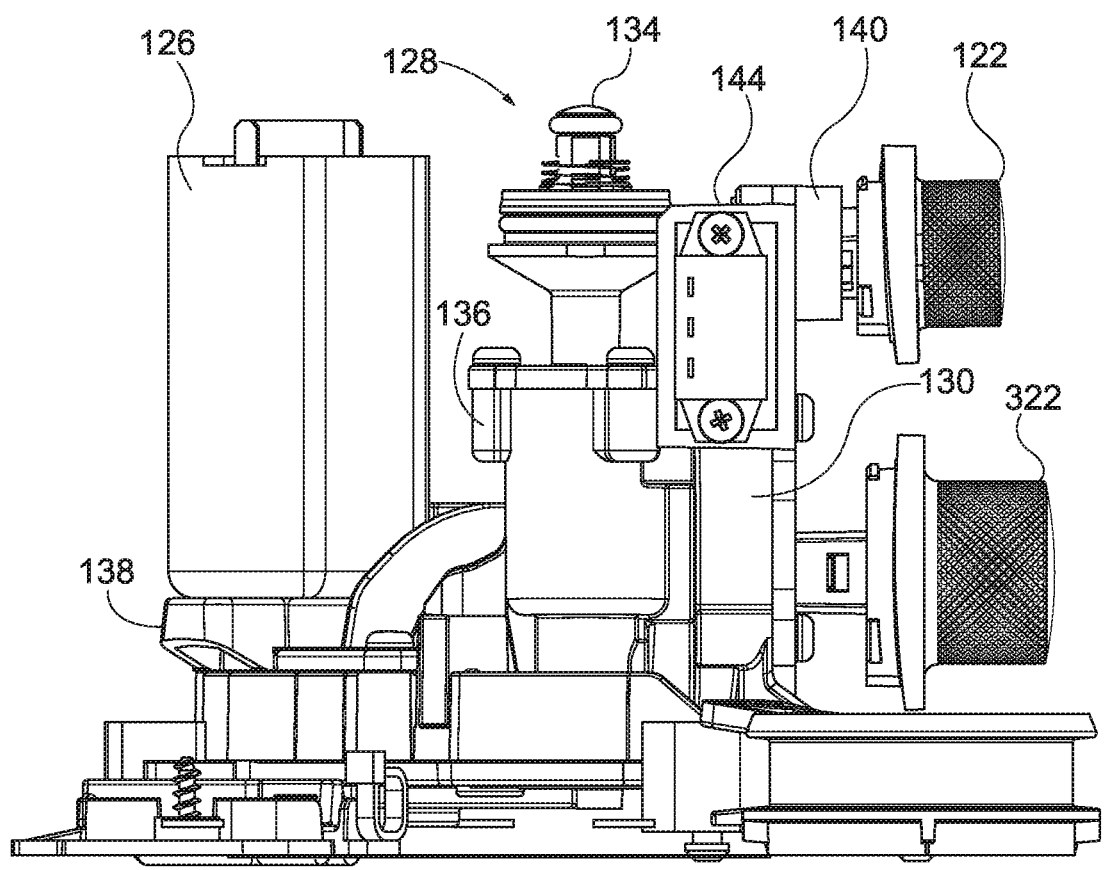
FIG. 4 is a simplified left side elevation view of fluid management components of the oral irrigator of FIG. 3A.

The power assembly 144 is actuated by the actuation assembly 122 to turn the oral irrigator on or off. In some embodiments, the power assembly 144 may be an electrical switch, a mechanical switch, or a combination (electrical/mechanical) switch. With reference to FIGS. 3A-3C, in these embodiments, the power assembly 144 includes a mechanical switch gear 149 that engages a switch 142 electrically connected to power terminal 147. Movement of the switch 142 closes or opens a connection between a power source (e.g., battery, wall power, etc.) and the motor 126. The power assembly 144 may also include a switch connector 145 that connects the switch gear 149 to the first actuation assembly 122 as discussed in more detail below.

Figure 5:
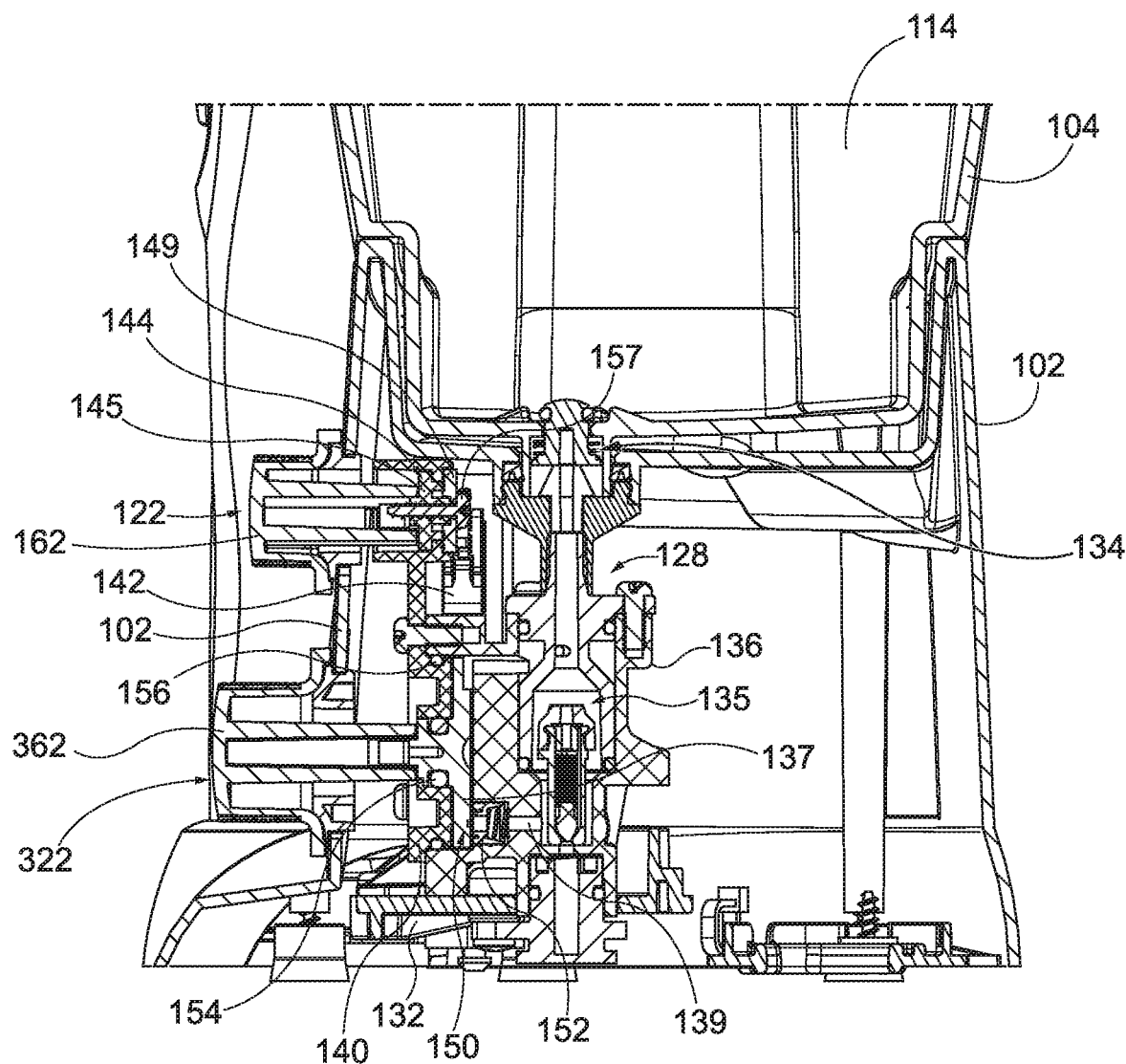
FIG. 5 is a cross sectional view of the oral irrigator of FIG. 3 taken along line 5-5 in FIG. 1.

With reference to FIG. 5, both the power assembly 144 and the pressure assembly 130 are connected to the control housing 140. The control housing 140 connects to the pump body 136 and supports the power assembly 144 and the pressure assembly 130 to connect with the actuation assemblies 122, 322 as discussed in more detail below.

First Actuation Assembly

The actuation assemblies 122, 322 actuate components in the base 102 of the irrigator 100. Turning to FIGS. 6A, 6B, 8A, 8B, 10A and 10C, the first actuation assembly 122 will be initially discussed first. The first actuation assembly 122 may include a first grip enhancement member 158, a first actuator 162, and a first bezel 166. Additionally, an augmentation fluid 300 is received between the first bezel 166 and the first actuator 162.

Figure 10A:
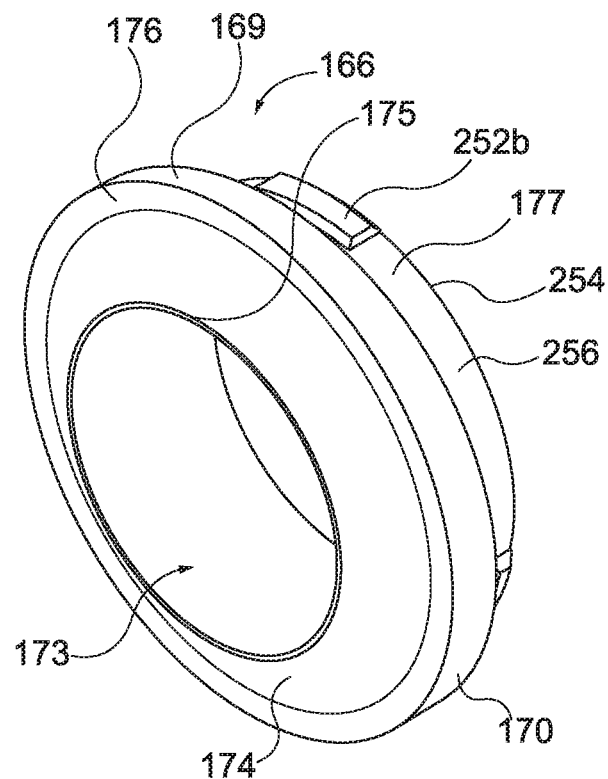
FIG. 10A is a front isometric view of a bezel of the actuation assembly of FIG. 6A.
Figure 10B:
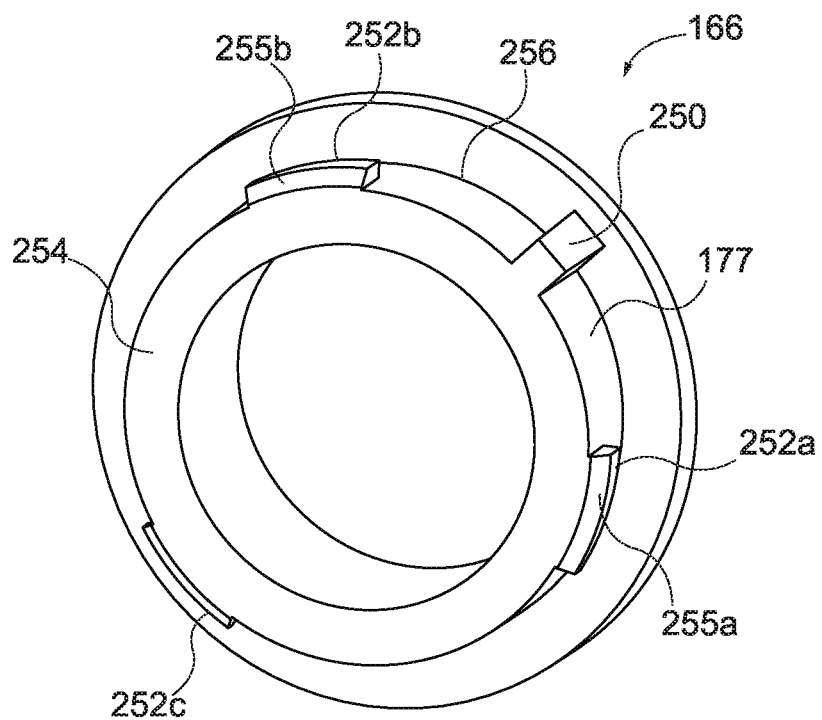
FIG. 10B is a rear isometric view of the bezel of FIG. 10A.
Figure 10C:
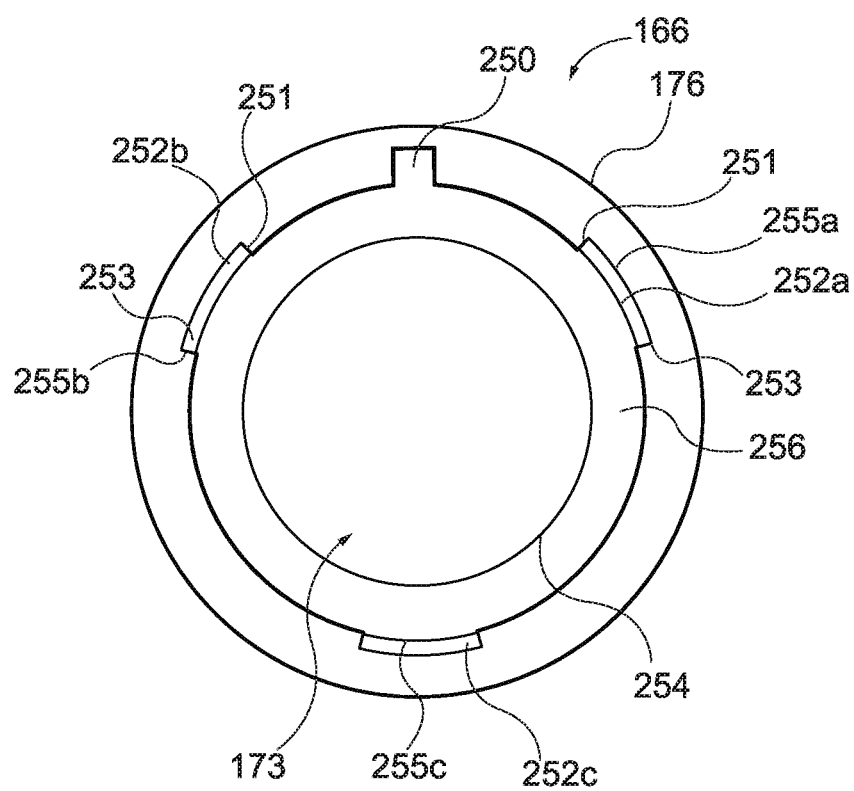
FIG. 10C is a rear elevation view of the bezel of FIG. 10A.

FIGS. 10A-10C illustrates various views of the first bezel 166. The first bezel 166 may include a main body 170 that may be generally ring shaped and define a receiving aperture 173 therethrough. A boss 256 may extend outward from a center of the main body 170 to a distal end 254. One or more retention features 252a, 252b, 252c may extend from an outer wall 177 of the boss 256. Additionally, a key element 250 may extend along a length of the outer wall 177 of the boss 256.

The retention features 252a, 252b, 252c are configured to engage with various aspects of the base 102 or housing of the oral irrigator. As shown in FIG. 100, in one embodiment there are three retention features 252a, 252b, 252c spatially separated along the surface of the outer wall 177. In one embodiment, each of the retention features 252a, 252b, 252c may be differently shaped to engage with different components of the housing 103 and to prevent movement relative thereto. For example, a first retention feature 252a and second retention feature 252b may be similarly shaped to one another and may taper in width from a first end 251 towards a second end 253, such the retention feature 252a, 252b are wider closer to the key element 250. In this example, the third retention feature 252c may be formed as a rectangular tab.

Additionally, each of the retention features 252a, 252b, 252c may have a larger base at the attachment to the outer wall 177 and decrease in area as they extend outward from the wall 177. For example, each of the retention features 252a, 252b, 252c may have beveled edges 255a, 255b, 255c that are angled away from the distal end 254 of the boss 256. In these instances, the beveled edges 255a, 255b, 255c may assist the insertion of the bezel 166 into the housing 103 and the varying width helps to ensure that the bezel 166 remains secured in place after it is inserted into the housing 103.

It should be noted that in other embodiments, the retention features 252a, 252b, 252c may be differently configured. For example, rather than separate features, an annular groove may extend around the boss 256. Fewer or more retention features may be used as well.

With continued reference to FIGS. 10A-10C, the bezel 166 also includes a reception or interfacing surface 174. In one embodiment the interfacing surface 174 may have a concave curved shape that curves radically outward from a proximal end 175 of the main body 170. The curvilinear shape may be a complex concave surface (e.g., parabolic) curving outward from a center of the main body 170. The shape of the interfacing surface 174 may be varied as desired, but in some embodiments is selected to correspond to a shape of the actuator 162 in order to reduce noise and friction between the two components. Further, the shape of the interfacing surface 174 is selected to hold or retain a desired amount of augmenting fluid 300, and therefore may not exactly follow the contour of the actuator 162 in order to define a space for the augmenting fluid 300 there between.

Figure 7A:
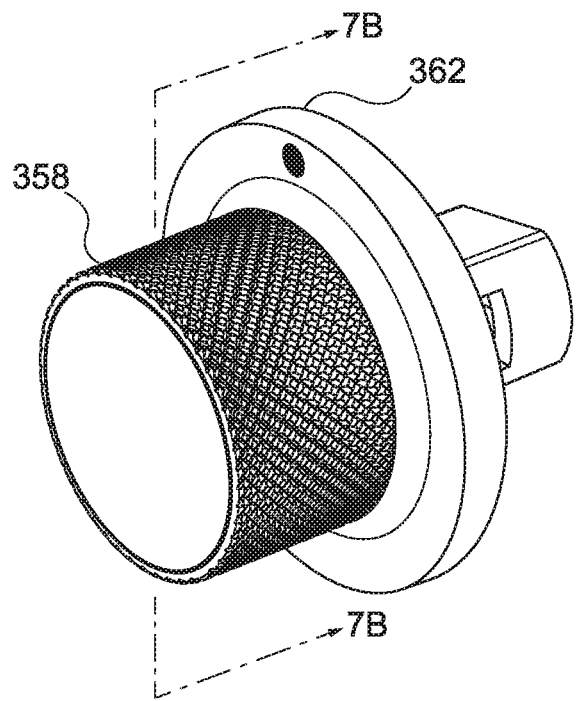
FIG. 7A is a front isometric view of a second example of an actuation assembly of FIG. 1.

The main body 170 may include a transition edge 176 between a cylindrical outer surface 169 of the main body 170 and the interfacing surface 174. The transition edge 176 may be formed as a substantially planar surface that extends around a perimeter of the interfacing surface 174. In some embodiments, a width of the outer surface 169 of the main body 170 varies as it extends around the main body 170. For example, as shown in FIG. 7A a first portion of the outer surface 169 may be thicker than a second portion of the outer surface 169. The outer surface 169 may be otherwise varied to correspond to an aperture defined within the housing 103 and thus the example shown in FIGS. 7A, and 10A-10C is illustrative only. The varying width of the outer surface 169 helps to prevent the actuator from being coupled to the housing 103 in an upside down orientation.

It may also be appreciated that rather than being a separately molded part, the first bezel 166 may be formed as an integral part of the control housing 140 or of the base 102. In addition, it may also be appreciated that the first actuator 162, described in further detail below, and the first bezel 166 may be made of different materials, such that one component may wear at a higher rate than the other. For example, the first bezel 166 may be made of an acetal thermoplastic whereas the first actuator 162 may be formed of another plastic of a different hardness. Should the first actuator 162 and the first bezel 166 be made from similar materials, the wear rate of each of the components would be similar and undesired pitting on the surfaces of each component could occur.

The first actuator 162 of the first actuation assembly 122 will now be discussed in more detail. FIGS. 12A-12D illustrates various views of the first actuator 162. The first actuator 162 may include a gripping body 182 with an annular flange 178 extending therefrom and a control shaft 180 extending from a distal end of the gripping body 182.

The gripping body 182 may be configured to be engaged by a user and may be shaped as desired. In one embodiment, the gripping body 182 may be cylindrically shaped and form a knob that can be rotated by a user. The gripping body 182 may optionally be configured to receive and secure the grip enhancement member 158 thereto. In these embodiments, the gripping body 182 may include a plurality of nodules 280 that extend along a length of the outer surface of the gripping body 182. In some embodiments, the nodules 280 are formed as longitudinal ridges that are spatially separated around the outer surface of the gripping body 182. A proximal end of the gripping body 182 defines a face 198. In one embodiment, a surface of the face 198 may be convexly shaped.

Figure 6A:
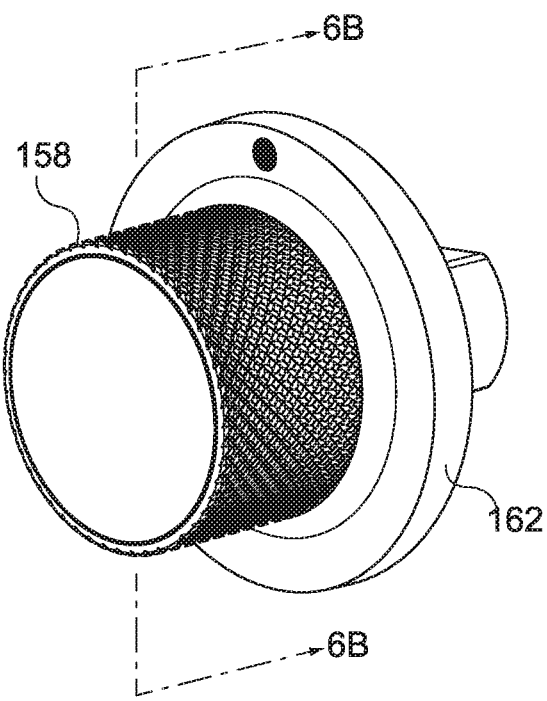
FIG. 6A is a front isometric view of a first example of an actuation assembly of FIG. 1.
Figure 6B:
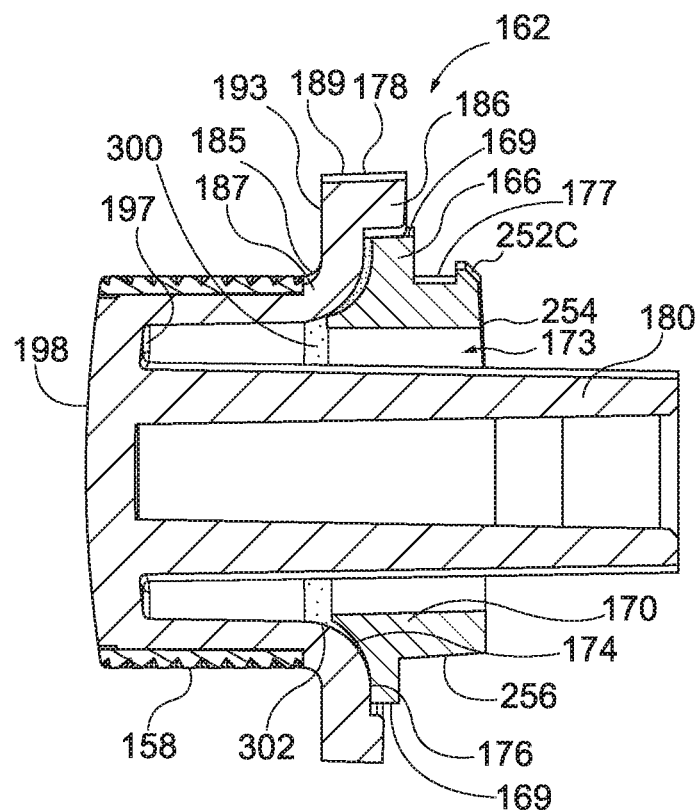
FIG. 6B is a cross sectional view of the first actuation assembly taken along line 6B-6B in FIG. 6A.
Figure 8A:
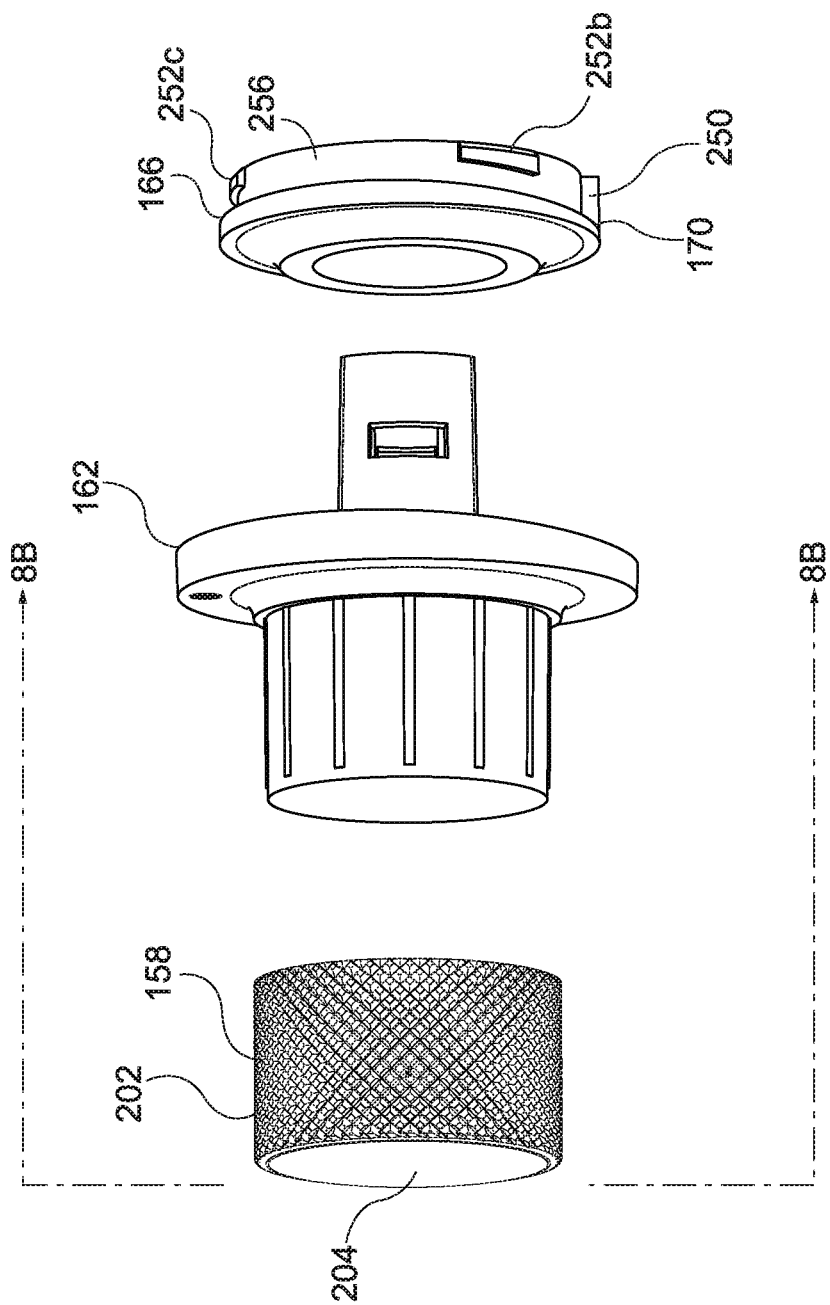
FIG. 8A is an exploded view of the first actuation assembly of FIG. 6A.
Figure 8B:
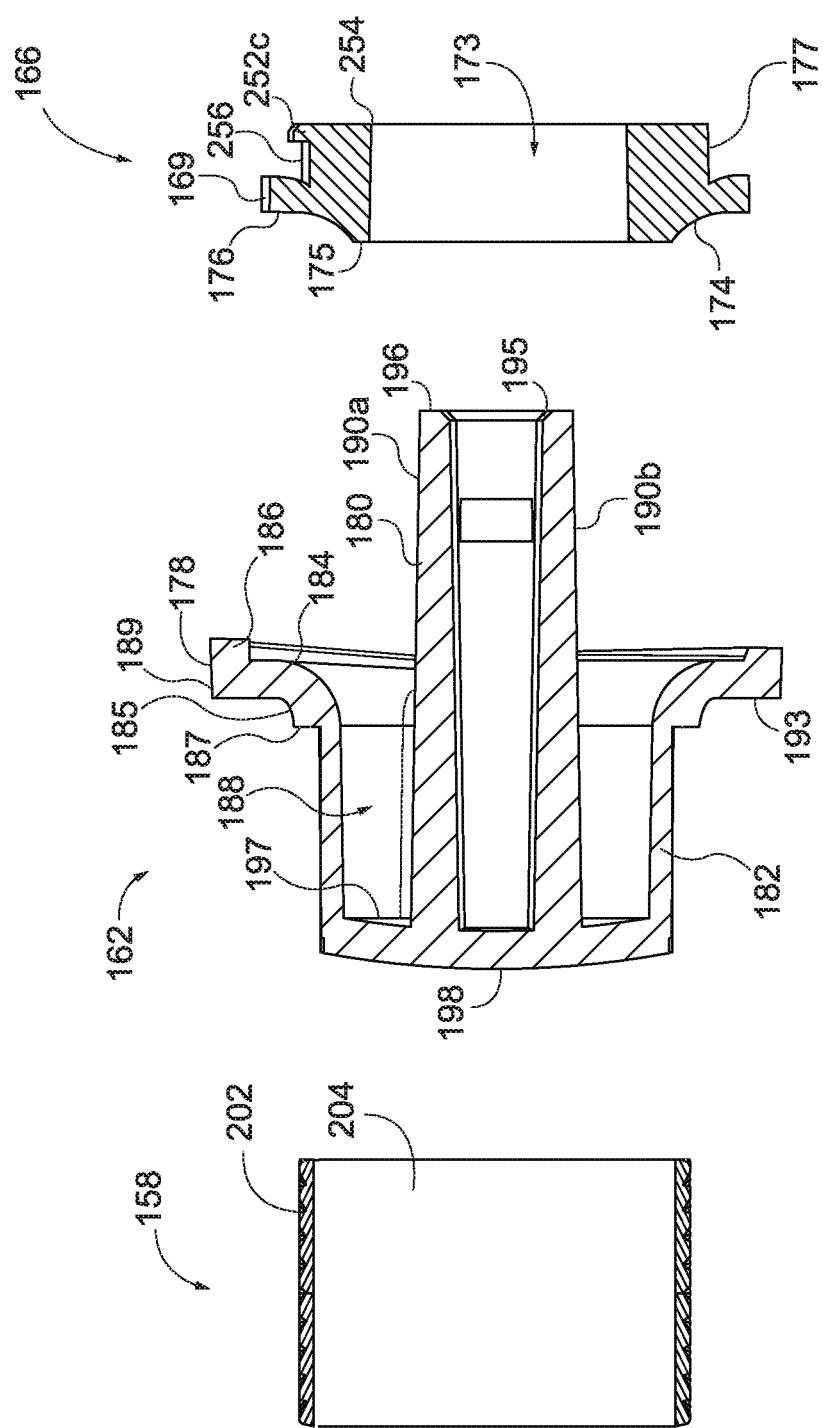
FIG. 8B is a cross sectional view of the first actuation assembly along line 8B-8B in FIG. 8A.
Figure 12A:
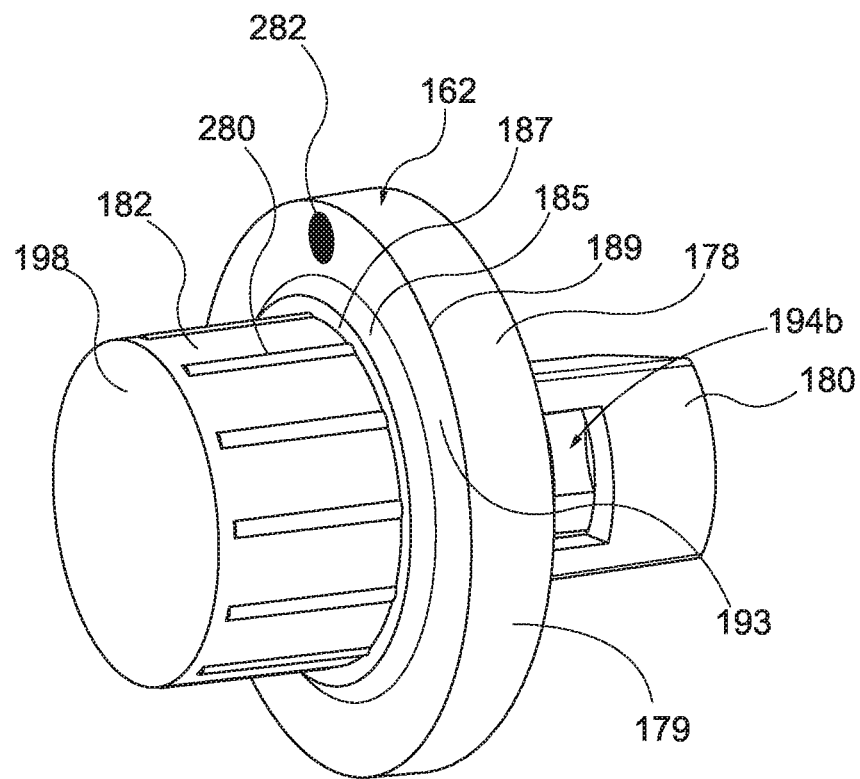
FIG. 12A is a front isometric view of an actuator of the actuation assembly of FIG. 6A.

With reference to FIGS. 6B, 8B and 12A, the gripping body 182 may transition at the distal end to form the flange 178 and may include a step 187 positioned between the gripping body 182 and a proximal surface 193 of the flange 178. The step 187 may be formed circumferentially around the distal end of the gripping body 182 and may have a planar cut surface 189 that transitions at an edge to define a curved surface 185 between the top surface 189 and the planar proximal surface 193 of the flange 178. The proximal surface 193 may extend circumferentially around the curved surface 185. The proximal surface 193 may extend to terminals at an interface with a cylindrical side wall 179 of the flange 178.

With reference to FIGS. 6B and 8B, on the interior of the first actuator 166, the gripping body 182 has a smooth transition to form the flange 178. In particular, an interfacing surface 184 may be defined as a curved surface that extends from a distal end of the gripping body 182 radically outward away from a center of the actuator 166. The interfacing surface 184 may have a curvature that substantially matches a curvature of the first bezel 166 as discussed in more detail below, but generally may be convexly curved and extend away from the gripping body 182. A lip 186 may be formed at the end of the interfacing surface 184 and extend substantially parallel to the sidewall 179 of the flange 178.

With reference to FIGS. 1 and 2, the flange 178 may be configured to be positioned on an exterior of the housing 103 of the oral irrigator 100. In some embodiments, the proximal surface 193 includes an indicator 282, such as a raised protrusion, colored mark (e.g., dot, dash, or the like that can be printed or otherwise defined on the actuator surface), or the like. The indicator 282 may be provided to allow a user to assess the position of the actuator 166 with respect to the internal components, e.g., to illustrate the current state of the switch or the valve connected to the actuator 166.

The control shaft 180 will now be discussed in more detail. With reference to FIGS. 7A, 9A and 12A-12C, the control shaft 180 extends from an interior surface 197 of the face 198 of the gripping body 182. In one embodiment, the control shaft 180 extends coaxially with the flange 178 and the gripping body 186. At least some portions of the control shaft 180 may have a smaller cross-sectional dimension than the inner diameters of the flange 178 and the gripping body 182 such that one or more cavity 188 may be defined between the outer surface 190 of the control shaft 180 and the interior surface of the gripping body 182.

Figure 12B:
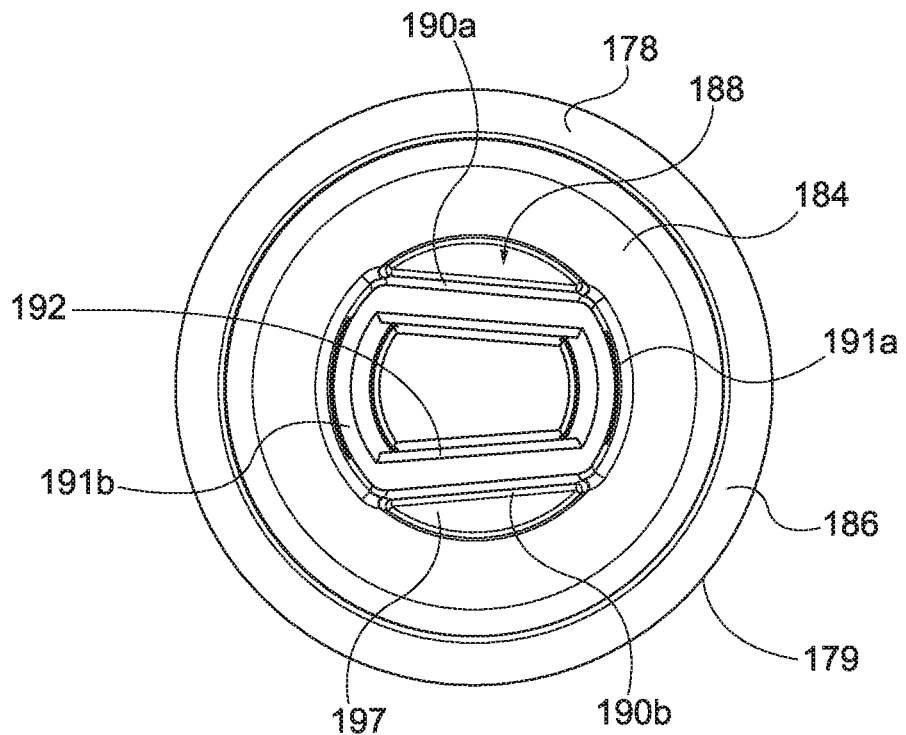
FIG. 12B is a rear elevation view of the actuator of FIG. 12A
Figure 12C:
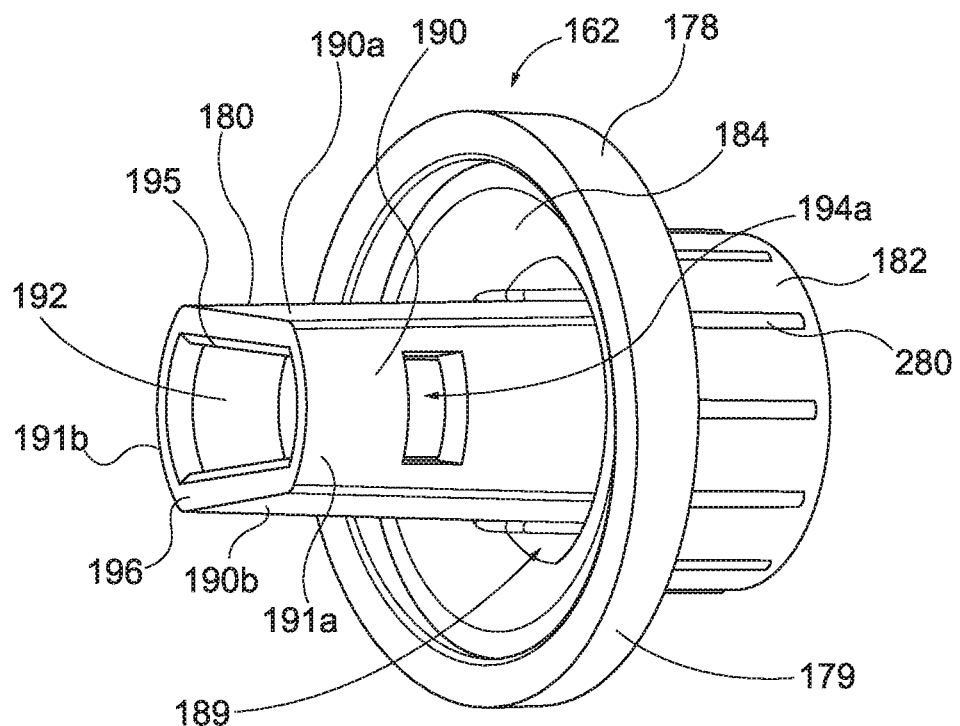
FIG. 12C is a rear isometric view of the actuator of FIG. 12A.
Figure 12D:
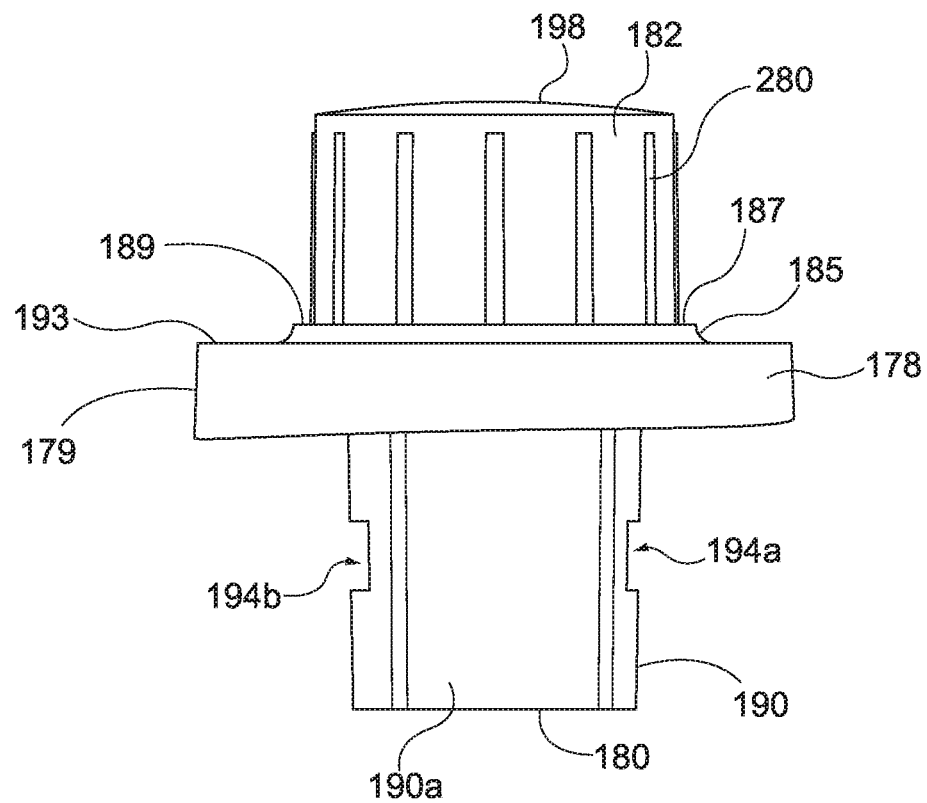
FIG. 12D is a bottom plan view of the actuator of FIG. 12A.

As shown in FIGS. 12B and 12C, the control shaft 180 may have two planar surfaces 190a, 190b. Two curved surfaces 191a, 191b may extend between edges of and connect the planar surfaces 190a, 190b. In some embodiments, the planar surfaces 190a, 190b may be angled such that the first curved surface 191a may have a smaller arc length as compared to the second curved surface 191b. In one embodiment, the control shaft 180 terminates at a distal end 196. The distal end 196 may define a beveled or angled "interior" edge 195. The interior edge 195 enhances a connection between the control shaft 180 and the switch of the power assembly 144 as discussed in more detail below. As shown in FIGS. 12A, 12C, and 12D, one or more windows 194a, 194b may be defined in the curved surfaces 191a, 191b. The windows 194a, 194b feature a four sided aperture that extends through the exterior surface 190 to an interior surface 192 of the control shaft 180. The windows 194a, 194b allow various components of the actuation assembly 172 to snap-fit to the control shaft 180.

With reference to FIGS. 6A, 6B, 8A and 8B, the first grip enhancement member 158 increases a frictional connection between the user's hands and the actuation assembly 122. The grip enhancement member 158 may include a textured pattern 202 or textured elements that extend around an outer surface of the grip enhancement member 158. In one embodiment, the textured pattern 202 is formed as diamond shaped ridges that are defined, engraved, or otherwise formed into the surface of the grip enhancement 158.

The grip enhancement member 158 can be formed integrally with the first actuator 166 or may be configured as a separate component therefrom. In one embodiment, the grip enhancement member 158 is a cylindrically shaped sleeve that is configured to slide over or wrap around and connect to the first actuator 166. In these embodiments, the grip enhancement member 158 can be formed out of a different material from the first actuator 166, such as a more expensive material (e.g., metal versus plastic) and does not require a large cost increase for the unit. In these embodiments, an interior surface 204 of the grip enhancement member 158 may be keyed to interface with the first actuator 166, or as shown in FIG. 8B, may be smooth and the grip enhancement member 158 may have a diameter configured to ensure a tight friction fit around the first actuator 166. In some instances the grip enhancement member 158 can be plastic or a chrome plated plastic. However, it has been found that the tactile interaction between the grip enhancement member 158 and the user may not provide adequate friction or tactile response with these materials as compared to embodiments where the grip enhancement member 158 is metal.

With reference to FIG. 6B, the augmentation fluid 300 is positioned within the gap 302 between interfacing surface 184 of the first actuator 162 and the interfacing surface 174 of the first bezel 166. The augmentation fluid 300 modifies or varies the frictional relationship between interfacing surfaces 174, 184 and may also absorb force, acoustical energy, or the like. In this manner, the augmentation fluid 300 augments or varies the user experience in actuating the actuation assembly 122. Examples of augmentation fluid 300 include lithium grease, silicon grease, and other lubricants. Table 1 illustrates examples of augmentation fluids 300 that can be used including various characteristics.

TABLE 1

| Product | "Feel" (Texture, color) | Service Temp. Range | Penetration (worked 60x) | Oil Separation (24 hrs @ 100° C.) | Evaporation (24 hrs @ 100° C.) |
| --- | --- | --- | --- | --- | --- |
| Fluorocarbon Gel 868VL | Ultra Light (Smooth, Off White) | −45° C. to 125° C. | 289 | <0.17% | 0.30% |

TABLE 1-continued

| Product | "Feel" (Texture, color) | Service Temp. Range | Penetration (worked 60x) | Oil Separation (24 hrs @ 100° C.) | Evaporation (24 hrs @ 100° C.) |
| --- | --- | --- | --- | --- | --- |
| Fluorocarbon Gel 868L | Very Light (Smooth, Off White) | −40° C. to 125° C. | 295 | <1.03% | 0.20% |
| Fluorocarbon Gel 868 | Light (Smooth, Off White) | −40° C. to 125° C. | 277 | <0.0% | 0.20% |
| Fluorocarbon Gel 868H | Medium (Smooth, Off White) | −30° C. to 125° C. | 265 | <0.0% | 0.20% |
| Fluorocarbon Gel 868VH | Heavy (Smooth, Off White) | −20° C. to 125° C. | 242 (unworked) | <0.0% | 0.20% |

Different characteristics of the augmentation fluid 300 can be changed to alter the user experience. For example, one characteristic of the augmentation fluid 300 is viscosity and an augmentation fluid 300 with a higher viscosity is more resistant to flow in response to friction or pressure than an augmentation fluid with a lower viscosity. In other examples, by changing the thickness, the density, the amount of fluid filling the gap 302, etc., different friction and/or force profiles can be generated. Similarly, varying the width, dimensions, and shape of the gap 302 will also change the user experience as this dimensional variation impacts the interaction of the augmentation fluid 300 between the interfacing surfaces 174, 184, as the fluid will expand or compress into the space. In one example, the gap is substantially any value below 0.05".

Second Actuation Assembly

With reference FIGS. 7A, 7B, 9A, 9B and 11a-11O, the second actuation assembly 322 will now be discussed in more detail. The second actuation assembly 322 is similar to the first actuation assembly 122, but may include some structural differences. However, in some embodiments the two assemblies may be the same as one another. The second actuation assembly 322 may include a second grip enhancement member 358, a second actuator 362, and a second bezel 366. Additionally, an augmentation fluid 500 is received between the second bezel 366 and the second actuator 362.

Figure 11A:
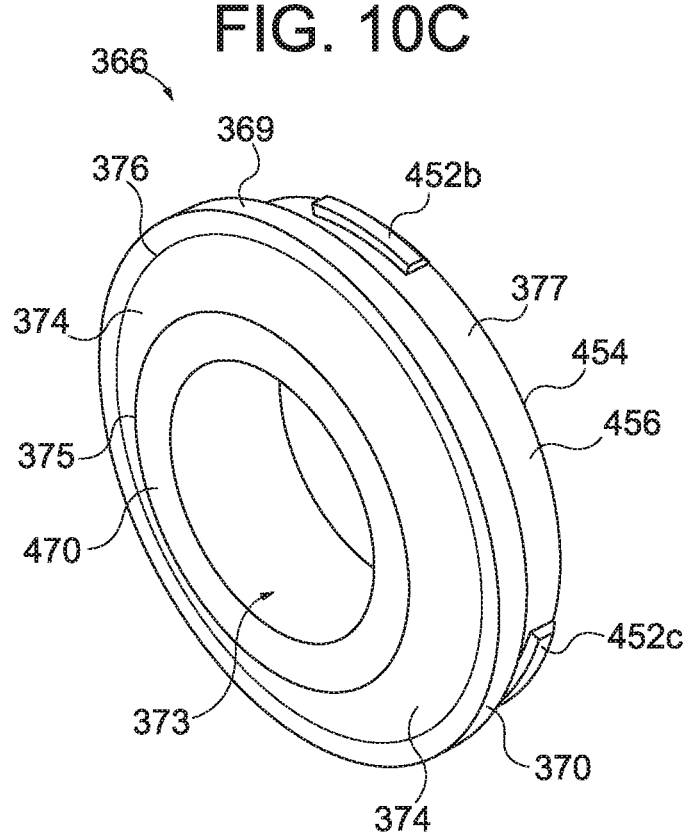
FIG. 11A is a front isometric view of a bezel of the actuation assembly of FIG. 7A.
Figure 11B:
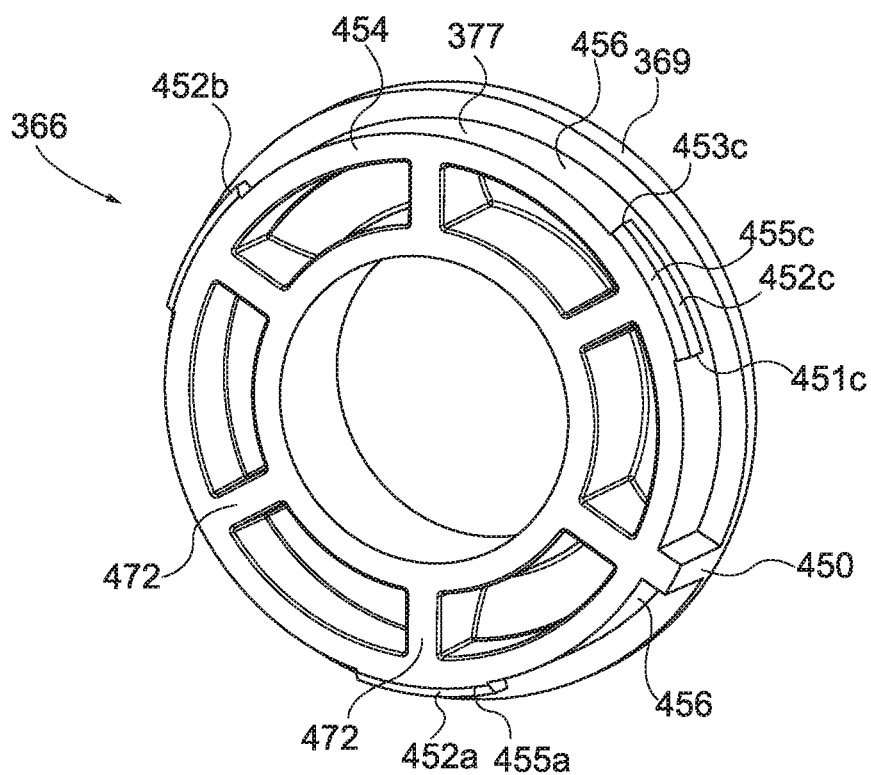
FIG. 11B is a rear isometric view of the bezel of FIG. 11A.
Figure 11C:
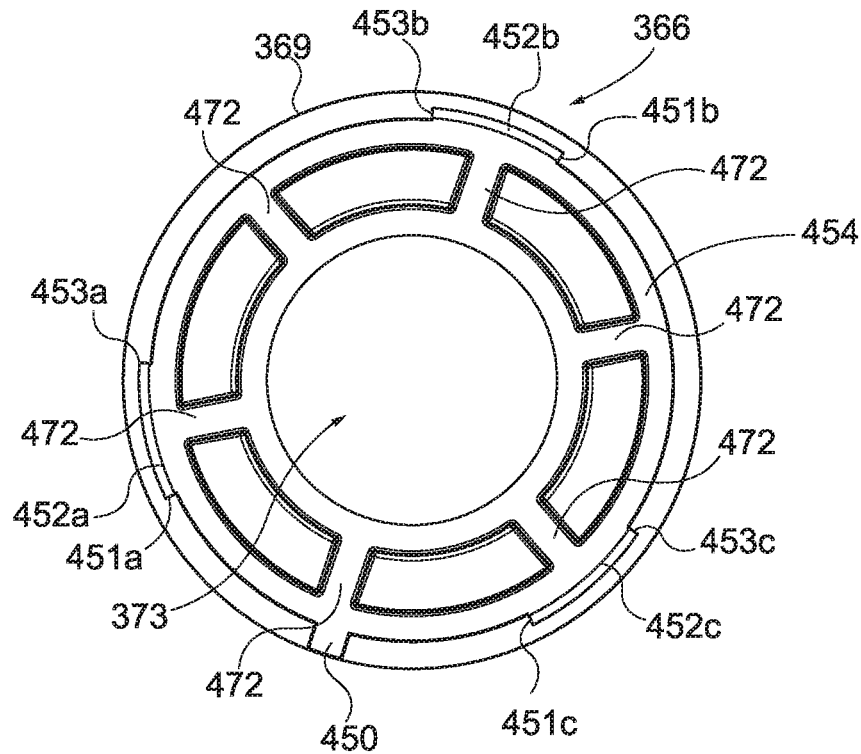
FIG. 11C is a rear elevation view of the bezel of FIG. 11A.

FIGS. 11A-11C illustrates various views of the second bezel 366. The second bezel 366 is generally similar to the first bezel 166, but may include webbing and other structural differences. The second bezel 366 includes a main body 370 that may be generally ring shaped and define a receiving aperture 373 therethrough. A boss 456 may extend outward from a center of the main body 370 to a distal end 454. One or more retention features 452a, 452b, and 452c may extend from an outer wall 377 of the boss 456. Additionally, a key element 450 may extend along a length of the outer wall 377 of the boss 456.

The retention features 452a, 452b, and 452c are configured to engage with various aspects of the base 102 or housing of the oral irrigator 100. In one embodiment, there are three retention features 452a, 452b, 452c spatially separated along the surface of the outer wall 377 of the boss 456. In one embodiment, each of the retention features 452a, 452b, 452c may be differently shaped to engage with different components of the housing 103 and to prevent movement relative thereto. For example, the first retention feature 452a and the second retention feature 452c may be similarly shaped to one another and may taper in width from a first end 451a, 451c toward a second end 453a, 453c such that the retention features 452a, 452c are wider closer to the key element 450. In this example, the third retention feature 452b may be formed as a rectangular tab.

Additionally, each of the retention features 452a, 452b, 452c may have a larger base at the attachment to the outer wall 377 and decrease in area as they extend outward from the wall 377. For example, each of the retention features 452a, 452b, 452c may have beveled edges 455a, 455b, 455c that are angled away from the distal end 454 of the boss 456. In these instances, the beveled edges 455a, 455b, 455c may assist the bezel 366 to be inserted into the housing 103 and the varying width helps to ensure that the bezel 366 remains secured in place after it is inserted into the housing 103.

It should be noted that in other embodiments, the retention features 452a, 452b, 452c may be differently configured. For example, rather than separate features, an annular groove may extend around the boss 456.

With continued reference to FIGS. 11A-11O, the bezel 366 also includes a reception or interfacing surface 374 and a proximal end 375 of the main body 370. In one embodiment, the proximal end 375 may form a planar surface. In one embodiment, the interfacing surface 374 may have a concavely curved shape that curves radically outward from the proximal end 375. The curvilinear shape may be a complex concave surface (e.g., parabolic) curving outward from a center of the main body 370. The shape of the interfacing surface 374 may be varied as desired, but in some embodiments is selected to correspond to a shape of the actuator 362, as discussed in more detail below, in order to further reduce noise and friction between the two components. Further, the interfacing surface 374 may be curved to hold or retain the augmenting fluid 300 and therefore may not exactly follow the contour of the actuator 362 in order to define a space for the augmentation fluid 500 there between.

Figure 9B:
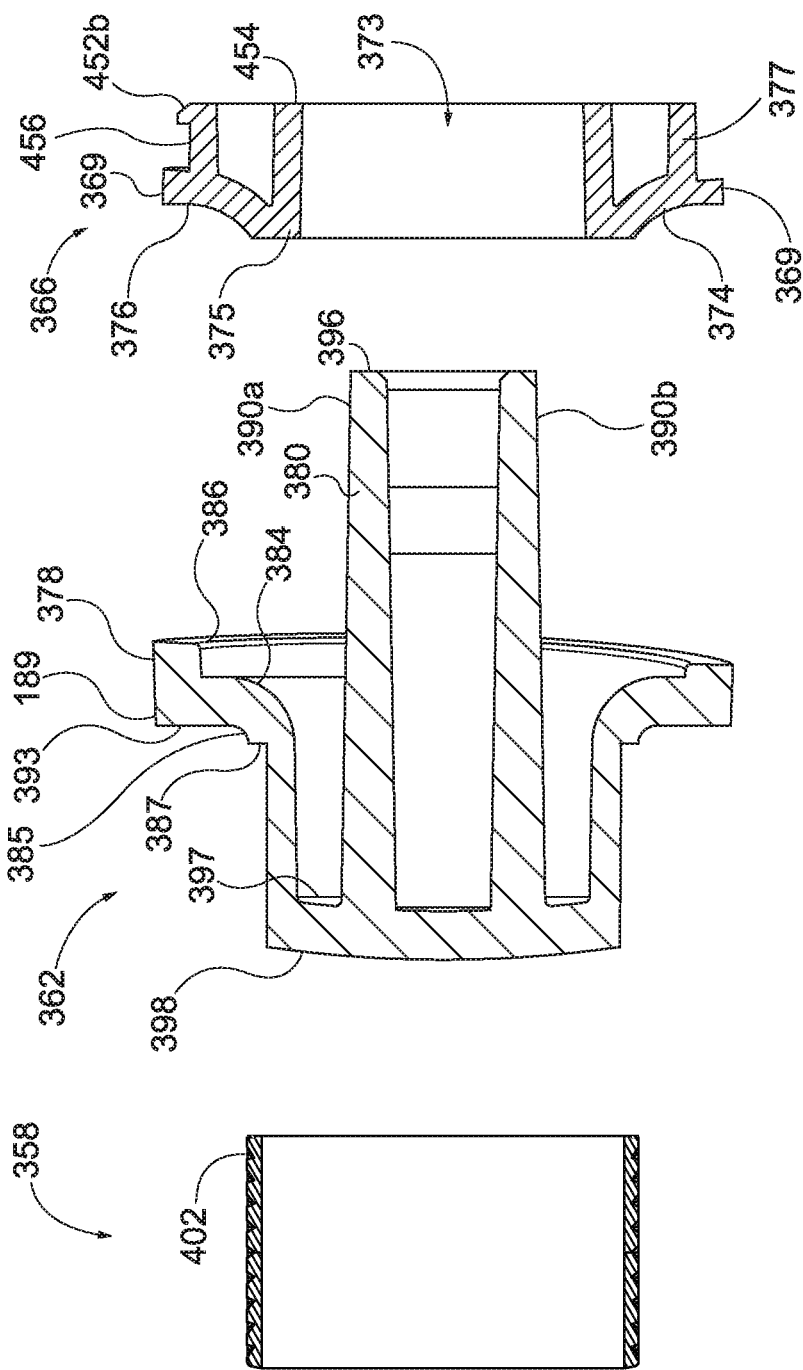
FIG. 9B is a cross sectional view of the second actuation assembly along line 9B-9B in FIG. 8A.

With continued reference to FIG. 11A, the main body 370 may include a transition edge 376 between a cylindrical outer surface 369 of the main body 370 and the interfacing surface 374. The transition edge 376 may be formed as a substantially planar surface that extends around a perimeter of the interfacing surface 374. In some embodiments, a width of the outer surface 369 of the main body 370 varies as it extends around the main body 370. For example, as shown in FIG. 9B, a first potion of the outer surface 369 may be thicker than a second portion of the outer surface 369. The outer surface 369 may be otherwise varied to correspond to an aperture defined within the housing 103 and the example shown in FIGS. 11A-11C is illustrative only.

The second bezel 366 may generally be similar to the first bezel 166 but with a few structural differences. As shown in FIG. 11A, generally the proximal end 375 of the second bezel 366 is formed by a planar face 470 that is parallel to a distal end 454. The second bezel 366 may also have webbing 472 on the distal end 454, as shown in FIGS. 11B and 11O. The webbing 472 decreases the amount of material used to form the second bezel 366 such that the component may be lighter and more economical to produce, while still providing sufficient structural strength.

It may also be appreciated that rather than being a separately molded part, the second bezel 366 may be formed as an integral part of the control housing 140 or of the base 102. In addition, it may also be further appreciated that the second actuator 362, as described in further detail below, and the second bezel 366 may be made of different materials, such that one component may wear at a higher rate than the other. Should the second actuator 362 and the second bezel 366 be made from similar materials, the wear rate of each of the components would be similar and undesired pitting at the surfaces of each component may form.

Figure 13A:
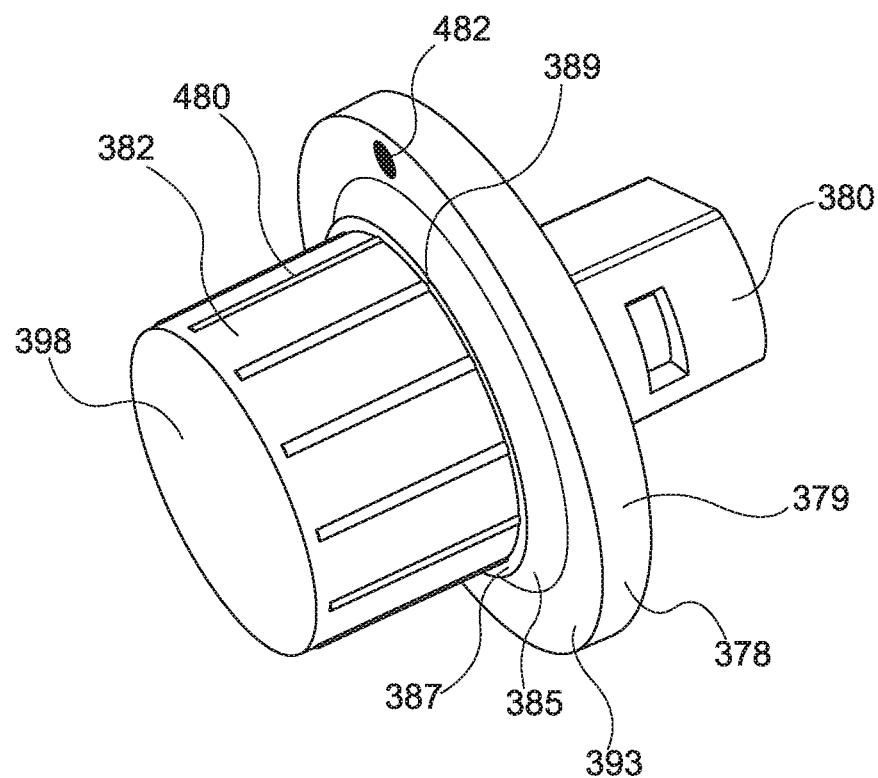
FIG. 13A is a front isometric view of an actuator of the actuation assembly of FIG. 7A.
Figure 13B:
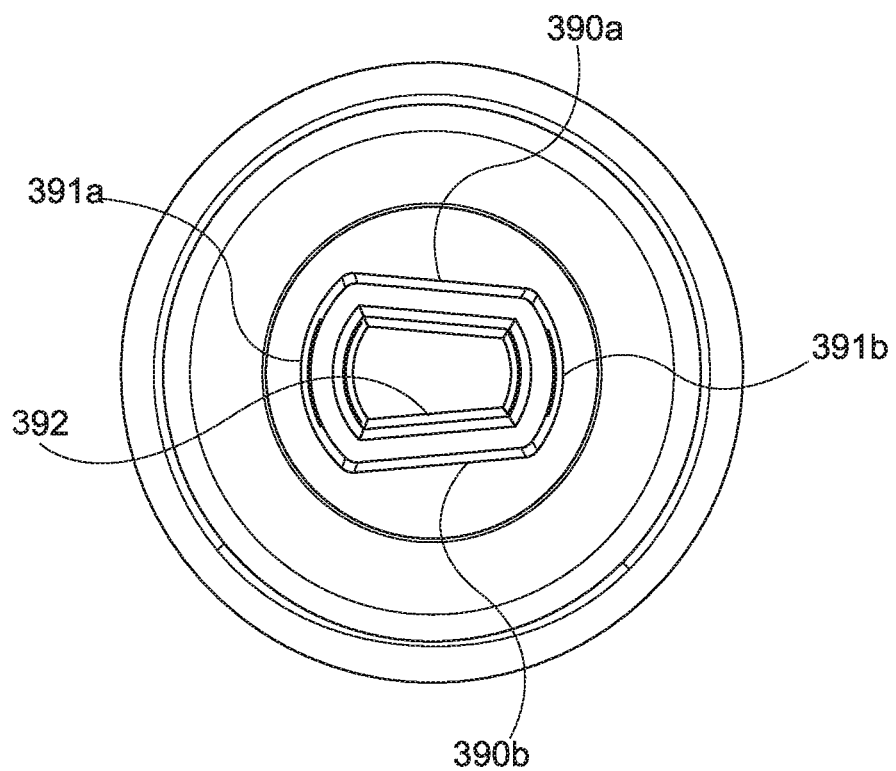
FIG. 13B is a rear elevation view of the actuator of FIG. 13A.
Figure 13C:
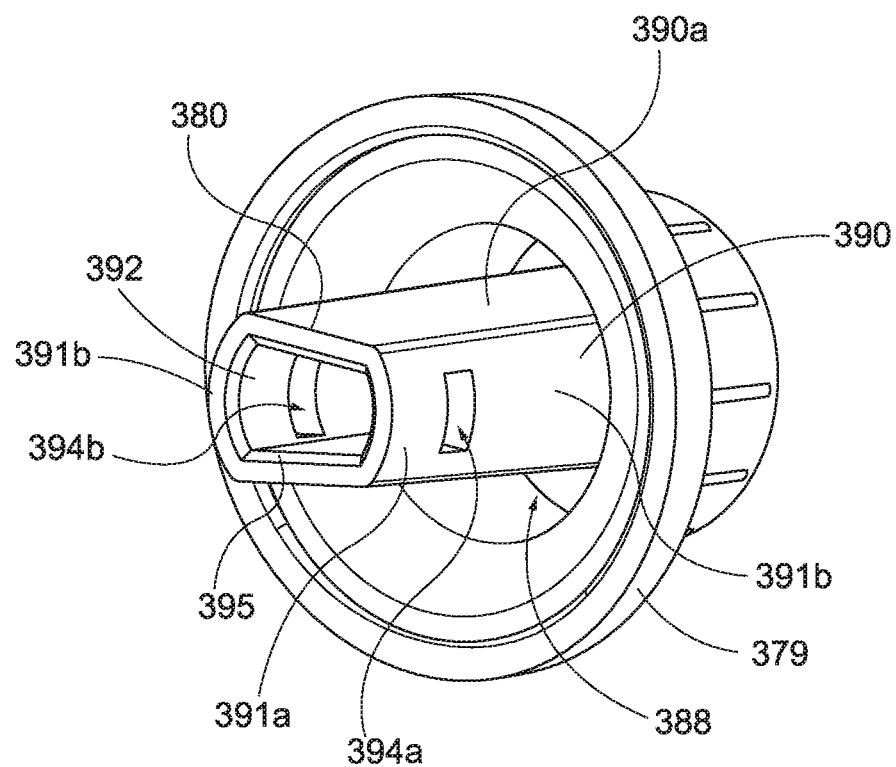
FIG. 13C is a rear isometric of the actuator of FIG. 13A.
Figure 13D:
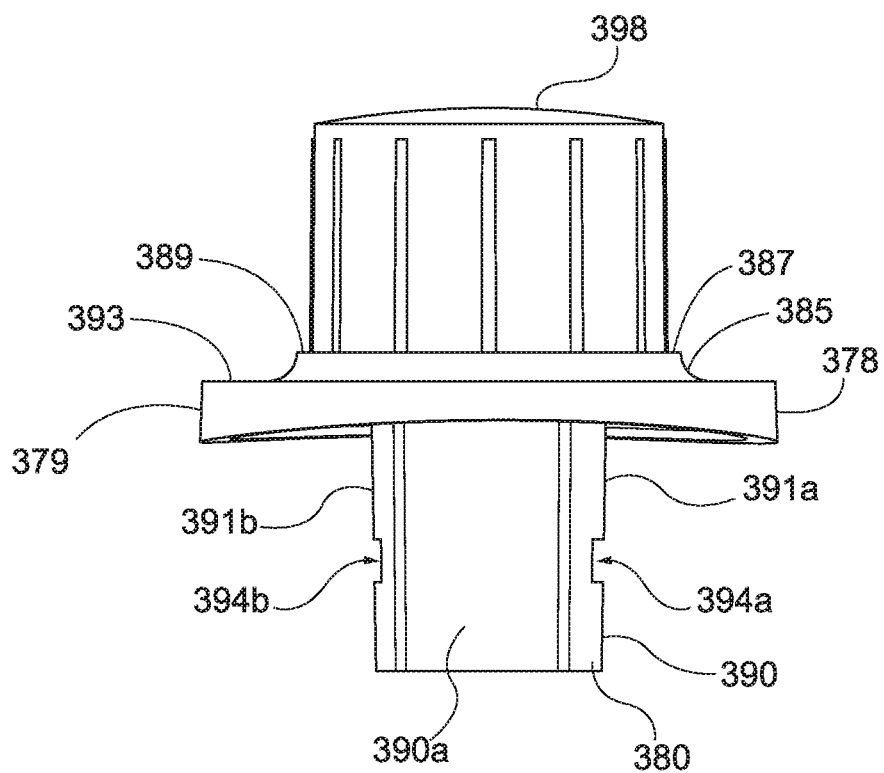
FIG. 13D is a bottom plan view of the actuator of FIG. 13A.

The second actuator 362 of the second actuation assembly 322 will now be discussed in more detail. FIGS. 13A-13C illustrates views of the second actuator 362. The second actuator 362 may include a gripping body 382 with an annular flange 378 extending therefrom and a control shaft 380 extending from a distal end of the gripping body 382.

The gripping body 382 of the second actuator 362 may be similar to the gripping body 182 of the first actuator 162. The gripping body 382 may be configured to be engaged by a user and may be shaped as desired. As shown in FIG. 13A, in this embodiment, the gripping body 382 may be cylindrically shaped and form a knob that can be rotated by the user. The gripping body 382 may optionally be configured to receive and secure the grip enhancement member 358 thereto. In these embodiments, the gripping body 382 may include a plurality of nodules 480 that extend along the length of the outer surface of gripping body 382. In some embodiments, the nodules 480 are formed as longitudinal ridges that are spatially separated around the outer surface of the gripping body 382. A proximal end of the gripping body 382 may form a face 398 with a convexly shaped surface.

With reference to FIGS. 7A-9A and 13A, the gripping body 382 may transition at the distal end to form the flange 378 and may include a step 387 positioned between the proximal body 382 and a top surface 389 of the flange 378. The step 387 may be formed circumferentially around the distal end of the gripping body 382 and may have a planar top surface 389 that transitions at an edge to define a curved surface 385 between the top surface 380 and the planar proximal of the flange 378 surface 393. The proximal surface 393 may extend circumferentially around a perimeter of the curved surface 385. The proximal surface 393 may extend to terminate as an interface with a cylindrical sidewall 379 of the flange 378.

Figure 7B:
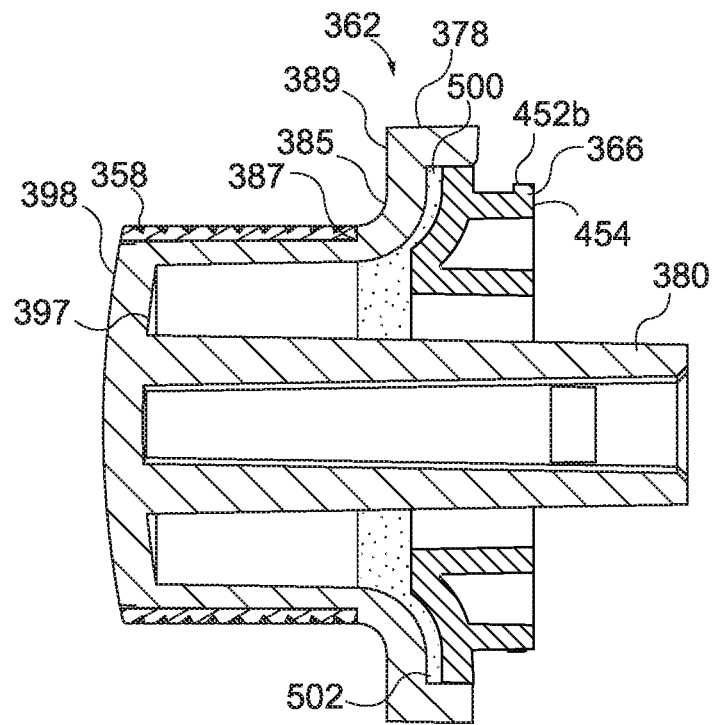
FIG. 7B is a cross section view of the second actuation assembly along line 7B-7B in FIG. 7A.

With reference to FIGS. 7B and 9B, on the interior of the second actuator 362, the gripping body 382 may define a smooth transition to form the flange 378. In particular, an interfacing surface 384 may be defined as a curved surface that extends from a distal end of the gripping body 382 radically outward away from a center of the actuator 362. The interfacing surface 384 may have a curvature that substantially matches a curvature of the second bezel 366 as discussed in more detail below, but generally may be convexly curved and extend away from the gripping body 382. A lip 386 may be formed at the end of the interfacing surface 384 and extend substantially parallel to the sidewall 379 of the flange 378.

As shown in FIGS. 1 and 2, the flange 378 may be configured to be positioned on an exterior of the housing 103 of the oral irrigator 100. In some embodiments, the proximal surface 393 includes an indicator 482, such as a raised protrusion, colored mark (e.g., dot, dash, or the like printed or otherwise defined), or the like. The indicator 482 may be provided to allow a user assess the position of the actuator 366 with respect to the internal components, e.g., to illustrate the current state of the valve connected to the actuator.

The control shaft 380 will now be described in more detail. As shown in FIGS. 7B and 9B, the control shaft 380 extends from an interior surface 397 of the face 398 of the gripping body 382. In one embodiment, the control shaft 380 extends coaxially with the flange 378 and the gripping body 386. At least some portions of the control shaft 380 may have a smaller cross-sectional dimension than the inner diameters of the flange 378 and the gripping body 382 such that one or more cavities 388 may be defined between the outer surface 390 of the control shaft 380 and the interior surface of the gripping body 382.

As shown in FIGS. 13B and 13C, the control shaft 380 may have two planar surfaces 390a, 390b. Two curved surfaces 391a, 391b may extend between edges of end connect the planar surfaces 390a, 390b. In some embodiments, the planar surfaces 190a, 190b may be angled, such that the first curved surface 391a may have a smaller arc length as compared to the second curved surface 391b. In one embodiment, the control shaft 380 terminates at a distal end 396. The distal end 396 may define a beveled or angled interior edge 395. The interior edge 395 enhances a connection between the control shaft 380 and the pressure valve 150 of the pressure assembly 130 as discussed in more detail below. One or more windows 394a, 394b may feature a four sided aperture that extends through an outer surface 390 to an interior surface 392 of the control shaft 380.

With reference to FIGS. 7A, 7B, 9A and 9B, the second grip enhancement member 358 may increase a frictional connection between the user's hands and the actuation assembly 322. The grip enhancement member 358 may include a textured pattern 402 or textured elements that extend around an outer surface of the grip enhancement member 358. In one embodiment, the textured pattern 402 is formed as diamond shaped ridges that are defined, engraved, or otherwise formed into the surface of the grip enhancement 358.

The grip enhancement member 358 may be integrally formed with the second actuator 362 or may be configured as a separate component therefrom. In one embodiment, the grip enhancement member 358 may be a cylindrically shaped sleeve that is configured to slide over or wrap around and connect to the second actuator 362 as discussed in more detail below. In these embodiments, an interior surface 404 of the grip enhancement member 358 may be keyed to interface with the second actuator 366 or as shown in FIG. 9B, may be smooth and the grip enhancement member 358 may have a diameter configured to ensure a tight friction fit around the actuator.

With reference to FIG. 7B, the augmentation fluid 500 is positioned within the gap 502 between interfacing surface 384 of the second actuator 362 and the interfacing surface 374 of the second bezel 366. The augmentation fluid 500 is similar to the augmentation fluid 300 used within actuator assembly 122. However, the augmentation fluid 500 may be varied to include different characteristics than the augmentation fluid 300 (e.g., it may have a different viscosity, or the like).

Operation of the Oral Irrigator

The overall assembly of the oral irrigator 100 will now be discussed. With reference to FIGS. 3A-5, the pump assembly 128, the pressure assembly 130, the power assembly 144, and the motor 126 are assembled and connected within the housing 103. For example, the pump valve 135 is received within the pump body 136, a drive linkage (not shown) is received within the gear assembly (not shown) and connected to a drive shaft (not shown) of the motor 126, and the chassis 132 is secured to a bottom surface of the housing 103. The pump inlet 134 is positioned on a top inlet of the pump body 136 and connected thereto. The pressure valve 150 of the pressure assembly 130 is connected to the pump body 136. For example, the pressure valve 150 is received within the cavity 137 of the pump body 136 as shown in FIG. 5.

The control housing 140 is then secured to the front of the pump body 136. For example, fasteners are used to secure the two components together. As shown in FIG. 5, the control housing 140 is connected to the pump body 136 to allow a portion of the pressure valve 150 to extend therethrough and be actuated by the actuation assemblies 122, 322.

The power assembly 144 is then connected to the control housing 140 and the motor 126. For example, as shown in FIG. 3C, the power terminal 147 and the switch 142 are connected to a first edge of the control housing 140. The switch connector 145 is connected via a fastener 157 to the switch gear 149 and extends through an aperture in the control housing 140. In this manner, the switch gear 149, which is positioned on a back side of the control housing 140 can be actuated by a connection between the first actuator 162 to the switch connector 145 positioned on the front side of the control housing 140.

Once the internal components of the oral irrigator 100 are assembled, the housing 103 is positioned over the components and the sidewalls are secured to the bottom surface. The reservoir 104 is then positioned on a top surface of the housing 103 and the pump inlet 134 extends through and fluidly connects to the fluid container compartment 114. The hose 110 is fluidly connected to the pump assembly 128 and the handle 102 such that fluid pumped by the pump assembly 128 from the reservoir 104, flows into the hose 110 and out to the handle 102.

After the housing 103 is connected, the actuation assemblies 122, 322 are connected to the housing 103. The bezel 166 is fitted into the housing 103. The housing 103 features apertures that engage with the retention features 252a, 252b, 252c of the bezel 166 shown in FIGS. 10B and 10C. The shape of the retention features 252a, 252b, 252c enhance the assembly process as the shape prevents movement of the bezel 166 once assembled to the housing 103. Alignment of the bezel 166 with the housing 103 is accomplished through a keyway or other alignment feature in the housing 103 that compliments the key element 250.

The augmentation fluid 300 is applied to the interfacing surface 184 of the actuator 162, the interfacing surface 174 of the bezel 166, or both. The control shaft 180 of the actuator 162 is then received through the aperture 173 of the bezel 166. The flange 178 is positioned adjacent to the housing 103. The gap 302 is defined between the interfacing surfaces 174, 184 filled with the augmentation fluid 300 as shown in FIG. 6B. As indicated above, the width of the gap, as well as the amount of fluid positioned within the gap can be varied based on a desired feel for the actuation assembly.

Once the actuator 162 is installed within the housing 103, the switch connector 145 is connected to the control shaft 180, connecting the power assembly 144 to the actuator 162. The beveled edge 195 of the control shaft may enhance the assembly process as alignment of the various parts may be easier given the particular shape.

The first grip enhancement member 158 is received onto the gripping body 182 until an end of the grip enhancement member 158 contacts the step 187. The nodules 280 of the gripping body 182 engage with the inside surface 204 of the grip enhancement member 158 to secure the grip engagement member 158 onto the gripping body 182. In one embodiment, the nodules 280 have an effective outer diameter that is slightly greater than the diameter of the inside surface 204 and create an interference fit with the grip enhancement member 158 when it is connected to the gripping body 182 due to the compression of the nodules 280 by the inside surface 204. Adhesive can additionally be used to secure the grip engagement member 158 to the gripping body 182.

The actuation assemblies can be installed simultaneously or in any order desired. In one embodiment, once the first actuation assembly 122 is connected to the housing 103, the second actuation assembly 322 may be connected to the housing 103. The housing 103 such that the housing 103 defines apertures that engage with the retention features 452a, 452b, 452c of the bezel 366 shown in FIGS. 11B and 110 the bezel 366 to the housing 103. That is, the retention features 452a, 452b, 452c are frictionally fit into and engage corresponding features on the housing 103. The retention features 452a, 452b, 452c help to prevent movement of the bezel 166 once assembled to the housing 103 by keying to the housing 103. The bezel 366 is aligned with the housing 103 through a keyway or other alignment feature in the housing 103 that compliments the key element 450.

The augmentation fluid 500 is applied to the interfacing surface 384 of the actuator 362, the interfacing surface 374 of the bezel 366, or both. The control shaft 380 of the actuator 362 is then received through the aperture 373 of the bezel 366. The flange 378 is thereby positioned adjacent to the housing 103. The gap 502 filled with the augmentation fluid 500 is then formed between the interfacing surfaces 374, 384, as shown in FIG. 7B.

Once the actuator 362 is installed within the housing 103, the pump valve 150 is connected to the control shaft 380, connecting the pressure assembly 130 to the actuator 362. The beveled edge 395 of the control shaft 380 may enhance the assembly process. The second grip enhancement member 358 is received onto the gripping body 382 until an end of the grip enhancement member 358 contacts the step 387. The connection of the gripping body 382 and the grip enhancement member 358 may be similar to the connection of the gripping body 182 and the grip enhancement member 158, such that the nodules 480 of the gripping body 382 engage with the inside surface 404 of the grip enhancement member 358 to secure the grip engagement member 358 onto the gripping body 382 by an interference fit. As before, adhesive may also be used.

To operate various features of the oral irrigator 100, a user engages the actuation assembly 122 to turn the oral irrigator on and off. To operate the assembly 122, a user grasps the first grip enhancement member 158 and rotates the first grip enhancement member, which in turn rotates the first actuator 162. This causes the mechanical switch gear 149 to rotate, correspondingly interfacing with the switch 142 on the power terminal 147.

As the user continues to rotate the first actuator 162 in the first direction, the mechanical switch gear 149 moves the switch 142 to complete a power circuit within the power terminal 147. This enables power to be supplied to the motor 126, causing the motor to rotate, moving the gear assembly. The gear assembly causes the pump assembly 128 to pull fluid from the fluid container compartment 114 of the reservoir 104 and push it to the tip 108.

To turn the oral irrigator 100 off, the user grasps the first grip enhancement member 158 and rotates in a second direction. This causes the first actuator 162 to rotate, moving the mechanical switch gear 149. Movement of the mechanical switch gear 149 in the second direction moves the switch 142 to a second position, disconnecting the power circuit within the power terminal 147.

The user engages the actuation assembly 322 to vary the pressure of the fluid expelled from the tip 108. To operate the actuation assembly 322, the user grasps the second grip enhancement member 358 and rotates it in the first direction. This rotation rotates the second actuator 362 connected thereto. The rotation of the second actuator 362 causes the bypass valve 150 to rotate, causing fluid within the pump body 136 to be siphoned through a bypass channel 139, reducing the pressure of the fluid supplied to the tip 108. When the bypass valve 150 is in a closed position, no fluid is siphoned through the bypass channel 139, and the fluid supplied to the tip 108 is at the highest pressure. When the bypass valve 150 is adjusted towards a semi-open or open position, fluid is siphoned away from the pump assembly such that the pressure of the fluid being supplied to the tip 108 is decreased. Because the actuation assembly 322 is rotatable, the user can achieve multiple different pressure levels by positioning the actuator at various locations.

When adjusting the actuation assembly 122, 322, the interaction of interfacing surfaces 174, 374 and 184, 384 with the augmentation fluid 300, 500 allows the user to experience a smooth sensation when rotationally adjusting the actuation assembly. As mentioned above, changing various characteristics of the augmentation fluid 300, 500 and the gap 302, 502 creates different user experiences. For example, in some embodiments, an augmentation fluid 300 with a higher viscosity may be used while the volume of fluid 300 remains constant. As such, if no other components are altered, the user may expend more effort to smoothly adjust the actuator assembly 122, as the higher viscosity of the augmentation fluid 300 increases the friction generated during the movement of interfacing surface 184 about the interfacing surface 174, thereby impeding the rotation of the interior interfacing surface 184 about the interfacing surface 174. The use of an augmentation fluid 500 with a higher viscosity would yield a similar result to a user operating actuation assembly 322.

In some embodiments, an augmentation fluid 300 with a lower viscosity may be used while the volume of fluid 300 remains constant. As such, if no other components are altered, the user may expend less effort to smoothly adjust the actuator assembly 122, as the lower viscosity of the augmentation fluid 300 decreases the friction generated during the movement of interfacing surface 184 about interfacing surface 174, thereby facilitating the rotation of the interfacing surface 184 about the interfacing surface 174. The use of an augmentation fluid 500 with a lower viscosity would yield a similar result to a user operating actuation assembly 322.

In some embodiments, the width of the gap 302 may be widened but the same volume of augmentation fluid 300 may be used. In this embodiment, the effective viscosity of the augmentation fluid 300 may be decreased as the augmentation fluid 300 may not coat the entire interfacing surface 184 and the interfacing surface 174 and also fill the gap 302. A user may expend less effort to smoothly adjust the first actuator assembly 122, facilitating the rotation of the interfacing surface 184 about the interfacing surface 174. The use of an augmentation fluid 500 with a larger gap 502 would yield a similar result to a user operating actuation assembly 322.

In some embodiments, the width of the gap 302 may be narrowed, while the same volume of augmentation fluid 300 may be used. In this embodiment, the effective viscosity of the augmentation fluid may be increased due to the increased pressure transmitted on the augmentation fluid because the width of the gap 302 is smaller. The increase in the effective viscosity will inhibit the rotation of the interfacing surface 184 about the interfacing surface 174, making the actuator assembly 122 more difficult to actuate. The use of an augmentation fluid 500 with a smaller gap 502 would yield a similar result to a user operating actuation assembly 322.

In all cases, the type and viscosity of augmentation fluid 300, 500 chosen should have adequate surface tension with respect to the width of the gaps 302, 502 such that the augmentation fluids 300, 500 do not leak or flow out of the gaps, but rather are retained in the gaps 302, 502 under normal environmental operating temperature ranges and atmospheric pressure ranges.

The oral irrigator 100 may be used in a wet environment. Therefore, the external portions of the first actuation assembly 122 and the second actuation assembly 322 may become damp or wet. The first grip enhancement member 158 and second grip enhancement member 358 provide a superior consumer experience regardless if the environment is dry, damp, or wet; or allowing a user to grip the assemblies firmly due to the patterned grip surfaces.

CONCLUSION

The foregoing description has broad application. For example, while examples disclosed herein may focus on two actuation assemblies, it should be appreciated that the concepts disclosed herein may equally apply to other irrigating devices, such as handheld units or portable units. Accordingly, the discussion of any example is meant only to be exemplary and is not intended to suggest that the scope of the disclosure or the claims is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto may vary.

The above specification, examples, and data provide a full description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An actuation assembly for an oral irrigator comprising:
a bezel positioned at least partially within and secured to a housing of the oral irrigator and comprising a bezel interfacing surface; and
an actuator operably connected to the bezel and moveable relative thereto and comprising an actuator interfacing surface, the actuator comprising:
a cylindrical body;
a face extending across an end of the cylindrical body to define a front wall, the face having an interior surface oriented towards the housing and an exterior surface oriented away from the housing; and
a control shaft integrally formed with and directly extending from the interior surface of the face along a central axis of the face, wherein movement of the cylindrical body causes the control shaft to directly actuate a switch within the housing; and
an augmentation fluid positioned between the bezel and the actuator; wherein
the augmentation fluid modifies a frictional relationship between the bezel and the actuator to provide a predefined resistance force between the actuator and the bezel as the actuator is rotated relative to the bezel.

2. The actuation assembly of claim 1, wherein:
the bezel is annular in shape and the bezel interfacing surface is formed as a concave annular trough; and
the actuator interfacing surface is annular in shape and is formed as a convex annular trough, such that a curvature of the concave annular trough corresponds to a curvature of the convex annular trough.

3. The actuation assembly of claim 2, wherein the actuator is at least partially separated from the bezel by the augmentation fluid.

4. The actuation assembly of claim 2, wherein a portion of the actuator contacts a portion of the bezel without augmentation fluid therebetween.

5. The actuation assembly of claim 2, wherein the bezel further defines an annular, planar surface adjacent to the bezel interfacing surface and positioned inside an inner radius of the concave annular trough.

6. The actuation assembly of claim 1, wherein:
the actuator is made of a first plastic material with a first hardness; and
the bezel is made of a second plastic material with a second hardness different from the first hardness.

7. The actuation assembly of claim 1, wherein the bezel is formed integrally with the housing for the oral irrigator.

8. The actuation assembly of claim 1, wherein:
the bezel defines an annular boss extending distally in an opposite direction from the bezel interfacing surface; and
a number of retention features extend radially outward from a distal end of the annular boss configured for engagement with opposing apertures in the housing of the oral irrigator.

9. The actuation assembly of claim 8, wherein a key feature extends radially outward from a distal end of the annular boss configured for insertion through an opposing keyway in the housing of the oral irrigator.

10. The actuation assembly of claim 1, further comprising a grip enhancement member defining a sleeve positioned around an outer surface of the cylindrical body.

11. The actuation assembly of claim 1, wherein:
the bezel defines a central aperture; and
the control shaft extends through the central aperture of the bezel and is mechanically coupled to the switch and configured to move the switch.

12. The actuation assembly of claim 1, wherein the exterior surface of the face defines a smooth terminal surface of the actuator.

13. The actuation assembly of claim 1, wherein the cylindrical body extends coextensively with the control shaft and the control shaft extends through the bezel and the housing of the oral irrigator.

14. An oral irrigator comprising:
a fluid reservoir;
a housing configured to support the fluid reservoir;
a pump positioned within the housing having an inlet fluidly connected to the fluid reservoir and an outlet;
a motor positioned within the housing that drives the pump;
a power source positioned within the housing that provides electricity to the motor;
an irrigator handle with a fluid outlet fluidly connected via a hose to the outlet of the pump;
a first bezel positioned at least partially within and secured to the housing, received within a first opening in the housing, and defining a central aperture within the first bezel, the first bezel comprising a first bezel interfacing surface;
a first actuator operably connected to the first bezel and moveable relative thereto, wherein the first actuator further comprises:
a cylindrical body;
a face extending across an end of the cylindrical body to define a front wall, the face having an interior surface oriented towards the housing and an exterior surface oriented away from the housing; and
a first control shaft integrally formed with and directly extending from the interior surface of the face along a central axis of the face, wherein movement of the cylindrical body causes the first control shaft to directly actuate a switch within the housing; and
a first actuator interfacing surface; and
a first augmentation fluid is positioned between the first bezel and the first actuator; wherein
the first augmentation fluid modifies a frictional relationship between the first bezel and the first actuator to provide a predefined resistance force between the first actuator and the first bezel as the first actuator is rotated relative to the first bezel.

15. The oral irrigator of claim 14, wherein:
the first bezel is annular in shape and the first bezel interfacing surface is formed as a concave annular trough; and
the first actuator interfacing surface is annular in shape and is formed as a convex annular trough, such that the concave annular trough corresponds to the convex annular trough.

16. The oral irrigator of claim 14, further comprising:
a second bezel secured to or formed as part of the housing, positioned about a second opening in the housing, and defining a central aperture within the second bezel;
a second actuator operably connected to the second bezel and moveable relative thereto, wherein the second actuator further comprises a second control shaft that extends through the central aperture in the second bezel and the second opening in the housing and is operably connected to a valve that controls fluid pressure of a fluid traveling from the pump to the handle; and
a second augmentation fluid is positioned between the second bezel and the second actuator; wherein
the second augmentation fluid modifies a frictional relationship between the second bezel and the second actuator to provide a predefined resistance force between the second actuator and the second bezel as the second actuator is rotated relative to the second bezel.

17. The oral irrigator of claim 16, wherein:
the second bezel comprises a second bezel interfacing surface;
the second actuator comprises a second actuator interfacing surface; and
a curvature of the second bezel interfacing surface corresponds to a curvature of the second actuator interfacing surface.

18. The oral irrigator of claim 17, wherein:
the second bezel is annular in shape and the second bezel interfacing surface is formed as a concave annular trough; and
the second actuator interfacing surface is annular in shape and is formed as a convex annular trough.

19. The oral irrigator of claim 16, wherein the first augmentation fluid has a first viscosity that is different from a second viscosity of the second augmentation fluid.

20. The oral irrigator of claim 14, wherein
the housing defines a cavity and the pump is positioned within the cavity; and
the first bezel is positioned within the first opening of the housing such that an edge of the housing engages an outer surface of the first bezel and a portion of the bezel is positioned against an exterior surface of the housing and a portion of the bezel is positioned against an interior surface of the housing.

21. The oral irrigator of claim 14, wherein the first control shaft is secured to the switch and configured to actuate the switch with the housing.

* * * * *